United States Patent
Schweizer et al.

(10) Patent No.: US 8,008,642 B2
(45) Date of Patent: Aug. 30, 2011

(54) COMPUTED RADIOGRAPHY SYSTEM FOR MAMMOGRAPHY

(75) Inventors: Stefan Schweizer, Paderborn (DE); Jacqueline A. Johnson, Woodridge, IL (US); Anthony R. Lubinsky, East Northport, NY (US)

(73) Assignee: Uchicago Argonne, LLC, Chicago, IL (US)

( * ) Notice: Subject to any disclaimer, the term of this patent is extended or adjusted under 35 U.S.C. 154(b) by 563 days.

(21) Appl. No.: 12/156,300

(22) Filed: May 30, 2008

(65) Prior Publication Data

US 2009/0078874 A1    Mar. 26, 2009

Related U.S. Application Data

(60) Provisional application No. 60/932,423, filed on May 30, 2007.

(51) Int. Cl.
*G01N 23/02* (2006.01)
(52) U.S. Cl. .......................................... 250/591
(58) Field of Classification Search .................. 250/580, 250/581, 582, 584, 585, 586, 591
See application file for complete search history.

(56) References Cited

U.S. PATENT DOCUMENTS

| | | | |
|---|---|---|---|
| 4,987,304 A | | 1/1991 | Kulpinski et al. |
| 5,140,160 A * | | 8/1992 | Boutet et al. ............... 250/586 |
| 5,541,421 A * | | 7/1996 | Brandt et al. ............... 250/586 |
| 5,596,202 A * | | 1/1997 | Arakawa .................. 250/484.4 |
| 5,665,962 A * | | 9/1997 | Kimura ....................... 250/226 |
| 6,180,955 B1 * | | 1/2001 | Doggett et al. .............. 250/586 |
| 6,352,949 B1 * | | 3/2002 | Willems et al. ................ 501/32 |
| 2005/0006608 A1 * | | 1/2005 | Koren ........................... 250/584 |
| 2005/0139794 A1 * | | 6/2005 | Kerr et al. .................... 250/585 |
| 2005/0274917 A1 * | | 12/2005 | Ishisaka ....................... 250/584 |
| 2005/0285062 A1 * | | 12/2005 | Gerstlauer et al. ........... 250/586 |
| 2006/0054845 A1 * | | 3/2006 | Satoh et al. ................... 250/584 |
| 2006/0124876 A1 * | | 6/2006 | Kahlert et al. ................ 250/584 |

OTHER PUBLICATIONS

A. R. Lubinsky et al., Storage Phosphor System for Computed Radiography: Screen Optics, Proc. SPIE 626, 120-132, (1986).
Robert K. Swank, Absorption and Noise in X-Ray Phosphors, J. Appl. Phys., vol. 44, No. 9, 4199-4203, (1973).
G. Chen et al., Fluorozirconate-based Nanophase Glass Ceramics for High-Resolution Medical X-ray Imaging, J. Non-Crystalline Solids 352, 610-614, (2006).

(Continued)

*Primary Examiner* — David Porta
*Assistant Examiner* — David S Baker
(74) *Attorney, Agent, or Firm* — Olson & Cepuritis, Ltd.

(57) ABSTRACT

A computed radiography system including a stimulating light source such as a laser, a photostimulable glass imaging plate (PGIP) substantially transparent to the stimulating light positioned such that the stimulating light impinges the PGIP perpendicularly thereto producing photostimulated luminescence light (PLL), a light collector having a light reflecting inner surface proximate the PGIP for collecting PLL emitted from the PGIP and having a hole or slot therein for admitting stimulating light into the light collector and onto the PGIP. An optical filter in communication with the light collector for blocking stimulating light waves and passing PLL therethrough. A light detector receives PLL from the optical filter and the light collector, mechanism providing relative movement between the PGIP and the stimulating light source, and mechanism including an analog to digital converter for converting the collected and detected PLL to a diagnostic readout. The system is particularly useful in mammography.

22 Claims, 14 Drawing Sheets

OTHER PUBLICATIONS

G. Chen et al., Insights into Phase Formation in Fluorochlorozirconate Glass-Ceramic Storage Phosphors, Appl. Phys. 88, 191915, 2006.

J.T. Dobbins, DQE(f) of Four Generations of Computed Radiography Acquisition Devices, Med. Phys. 22 (10),1581-1593, (1995).

A. Edgar et al., Photostimulated Luminescence in a Rare Earth-Doped Fluorobromozirconate Glass Ceramic, Appl. Phys. Letters 75, No. 16, 2386-2388, (1999).

A. Edgar et al., Structural Phase Changes in Barium Bromide . . . Glass Ceramic X-ray Storage Phosphor, J. Phys.: Condens, Matter 13, 6259-6269, (2001).

A. Edgar et al., Optical Properties of a High Efficiency Glass Ceramic X-ray Storage Phospor, Radiation Measurements 38, 413-416, (2004).

A. Edgar et al., Spatial Resolution of a Glass-Ceramic X-ray Storage Phosphor, Current Applied Physics 6, 399-402, (2006).

H. Fujita et al., Accurate Measurement of Characteristic Curves . . . Aluminum Stepwedge Technique, Medical Physics, vol. 13 (6), 922-924 (1986).

B.E. Kinsman et al., Preparation and Purification of Metal Fluorides for Crystals and Glasses, Adv. Mat. for Optics and Electronics, vol. 5, 109-115 (1995).

G. Lubberts, Random Noise Produced by X-Ray Fluorescent Screens, Journal of the Optical Society of America, vol. 58, 11, 1475-1483, (1968).

S. Obenauer et al., Dose Reduction in Full-Field Digital Mammography: an Anthropomorphic Breast Phantom Study, British Journal of Radiology 76, 478-482 (2003).

J.M. Parker, Fluoride Glasses, Annual Reviews Material Science, vol. 19, 21-41 (1989).

J.A. Rowlands, The Physics of Computed Radiography, Physics in Medicine and Biology, vol. 47, R123-R166 (2002).

J.S. Sanghera et al., Effect of Aluminum Fluoride on the Physical Properties and Stability . . . Glasses, Journal American Ceramic Society vol. 73, No. 9, 2677-83 (1990).

S. Schweizer, Review Article—Physics and Current Understanding of X-Ray Storage Phosphors, Phys. Stat. Sol. (a) 187, No. 2, 335-393 (2001).

S. Schweizer et al., Photostimulated Luminescence in Eu-doped Fluorochlorozirconate Glass Ceramics, Applied Physics Letters, vol. 83, No. 3, 449-451, (2003).

S. Schweizer et al., Photostimulated Luminescence From Fluorochlorozirconate Glass Ceramics and the Effect of Crystallite Size, J. Appl Phys vol. 97, (2005).

M. Secu et al., Photostimulated Luminescence From A Fluorochlorozirconate . . . Effect of Crystallite Size and Phase, J. of Physics: Condensed Matter (15), 1097-1108, (2003).

M. M. Broer, Melting Apparatus for the Synthesis of Bulk $ZrF_4$-Based Fluoride Glass, J. Am. Ceram. Soc. 72 (3), 492-495, (1989).

W. G. Ji et al.; Digital X-Ray Imaging Using Amorphous Selenium: Reduction of Aliasing, Med. Phys. 25 (11) 2148-2162, (1998).

W. Zhao et al., Digital Radiology Using Active Matrix Readout of Amorphous Selenium: Theoretical Analysis of Detective Quantum Efficiency, Med. Phys. 24 (12) 1819-1833, (1997).

J. H. Siewerdsen et al., Signal, Noise Power Spectrum, and Detective Quantum Efficiency . . . Flat-Panel Imagers for Diagnostic Radiology, Med. Phys. 25 (5) 614-628, (1998).

J. H. Siewerdsen et al., Empirical and Theoretical Investigation of the Noise . . . Flat-Panel Imagers (AMFPIs) for Diagnostic Radiology, Med. Phys. 24 (1) 71-89, (1997).

A. D. A. Maidment et al., Analysis of the Spatial-Frequency-Dependent DQE of Opticaly Coupled Digital Mammography Detectors, Med. Phys. 21 (6) 721-729, (1994).

R. M. Nishikawa et al., Scanned-Projection Digital Mammography, Med. Phys. 14 (5), 717-727, (1987).

R. Schaetzing et al., Digital Imaging in Diagnostic Radiology, Digital Radiography Using Storage Phosphors, Ed. J.D. Newell and C.A. Kelsey, Churchill Livingstone, NY, (1990).

* cited by examiner

COMPUTED RADIOGRAPHY SYSTEM FOR MAMMOGRAPHY

The United States Government has rights in this invention pursuant to Contract No. W-31-109-ENG-38 between the United States Government and The University of Chicago and/or pursuant to Contract No. DE-AC02-06CH11357 between the United States Government and UChicago Argonne, LLC representing Argonne National Laboratory.

FIELD OF THE INVENTION

This invention relates to a computed radiography (CR) system, components and method relating to mammography.

BACKGROUND OF THE INVENTION

In recent years computed radiography (CR) systems have been successful in replacing analog screen/film (SF) in many clinical settings. Such CR systems use photostimulable x-ray storage phosphor plates (for example, $BaFBr:Eu^{2+}$), which are exposed in cassettes and then brought to an automated plate scanner, to read out the stored image information.

CR systems bring numerous advantages such as electronic transmission and storage, image processing, and computer-aided diagnosis to clinical departments, in a practical and highly affordable way. However, technical progress in the CR field has reached a plateau (perhaps in part because of economic developments at the chemical imaging companies who originally supported the development of the technology), and CR image quality performance has been surpassed by flat-panel based digital radiography (DR) systems.

DR systems, however, are much more expensive than CR, which has limited their clinical acceptance. A single CR reader can support multiple cassettes and replacing the SF cassettes with CR cassettes can retrofit an entire radiology department. Each individual detector in a room requires a separate DR detector. Furthermore, the replacement cost for a worn out or broken DR detector can be ten to one hundred times more expensive than replacing a CR cassette.

The image quality performance of CR has been limited in the past by three factors: (1) When the CR screen is made thick enough to achieve good x-ray absorption, the spatial resolution is disadvantaged compared to SF or DR, a particular problem for applications like mammography or bone radiography, (2) Because of limitations in screen conversion gain, collection efficiency, and detection efficiency, in a CR system that is not optimally designed, the number of detected electrons per absorbed x-ray ("gain") can become low enough to become a secondary quantum sink, (3) CR systems have been observed to have rather high gain fluctuation noise, or "Swank noise", compared to high quality SF or DR systems.

The proposed novel CR detector system is significant because it removes the above-mentioned image quality limitations at an affordable cost. A CR system based on novel transparent storage phosphor (TSP) materials and improved scanner apparatus provides image quality equal to or better than DR, in particular for the high-resolution application of mammography.

SUMMARY OF THE INVENTION

It is a principal object of the present invention to provide a computed radiography system, comprising a stimulating light source, a photostimulable glass imaging plate (PGIP) substantially transparent to the stimulating light positioned such that the stimulating light impinges the PGIP perpendicularly thereto producing photostimulated luminescence light (PLL) having a wave length different from the stimulating light source, a light collector having a light reflecting inner surface proximate the PGIP for collecting PLL emitted from the PGIP and having a hole or slot therein for admitting stimulating light into the light collector and onto the PGIP, an optical filter in communication with the light collector for blocking stimulating light waves and passing PLL therethrough, a light detector receiving PLL from the optical filter and the light collector, mechanism providing relative movement between the PGIP and the stimulating light source, and mechanism including an analog to digital converter for converting the collected and detected PLL to a diagnostic readout.

Another object of the present invention is to provide a computed radiography system, comprising a stimulating light source, a photostimulable glass imaging plate (PGIP) having nanocrystalline particles distributed therein substantially transparent to the stimulating light positioned such that the stimulating light impinges the PGIP perpendicularly thereto producing photostimulated luminescence light (PLL) having a wave length different from the stimulating light source, a hollow light collector having a light reflecting inner surface proximate the PGIP for collecting PLL emitted from the PGIP and having a hole or slot therein for admitting stimulating light into the hollow light collector and onto the PGIP, an optical filter in communication with the hollow light collector for blocking stimulating light waves and passing PLL therethrough, a light detector receiving PLL from the optical filter and the hollow light collector, mechanism providing relative movement between the PGIP and the stimulating light source, and mechanism including an analog to digital converter for converting the collected and detected PLL to a diagnostic readout.

A final object of the present invention is to provide a computed radiography system for reading exposed mammography plates, comprising a source of laser light having a wavelength in the range from about 500 nms to about 750 nms, a photostimulable glass imaging plate (PGIP) having nanocrystalline particles distributed therein previously exposed to x-ray radiation and substantially transparent to the laser light positioned such that the laser light impinges said PGIP perpendicularly thereto producing photostimulated luminescence light (PLL) having a wave length different from and less than the laser light, a hollow light collector having a light reflecting inner surface proximate the PGIP for collecting PLL emitted from the PGIP and having a hole or slot therein for admitting laser light into the hollow light collector and onto the PGIP, an optical filter in communication with the hollow light collector for blocking laser light and passing PLL therethrough, a light detector receiving PLL from the optical filter and the hollow light collector, mechanism providing relative movement between the PGIP and the laser light, and mechanism including an analog to digital converter for converting the collected and detected PLL to a diagnostic readout.

The first limitation described in the background section is overcome by the development of a storage phosphor material, which is transparent at the wavelength of the stimulating light. In a point scanned CR system using a transparent storage phosphor, the presampling Modulation Transfer Function (MTF) is determined by the size of the scanning laser beam, not the light scattering in the phosphor, and is thus decoupled from phosphor thickness. The imaging plate thickness can then be increased to maximize x-ray absorption for a given application, without suffering a resolution loss. This is a fundamental advantage of the novel TSP material.

The second limitation has been addressed on the materials side. ZBLAN storage glasses exhibit a useful dispersion in the behavior of optical turbidity (scattering) vs. wavelength, see U.S. patent application Ser. No. 11/267,056 filed Nov. 4, 2005 by Johnson et al., the entire disclosure of which is incorporated by reference. The optical scattering coefficient at the wavelength of the emitted (signal) light can be an order of magnitude higher than at the wavelength of the stimulating (scanning) light, due to scattering from the PSL-active $BaCl_2$ crystallites in the ZBLAN glasses. This is highly desirable in a scanned CR system, because the collection efficiency (gain) for the emitted light is then much improved. In addition, a novel design for the light collector apparatus in the scanner for these materials, which improves the efficiency (gain) by yet another factor of two (as well as reducing "flare" and image artifacts and improving dynamic range) is disclosed.

Finally, the third limitation of current CR systems due to gain fluctuation noise is reduced. At least part of this noise is due to the depth variation of the signal light collection efficiency and scanning light-stimulation efficiency brought about by light scattering from phosphor particles dispersed in a binder. These effects are absent in a transparent storage phosphor system.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

DETAILED DESCRIPTION OF THE INVENTION

Figure 1:
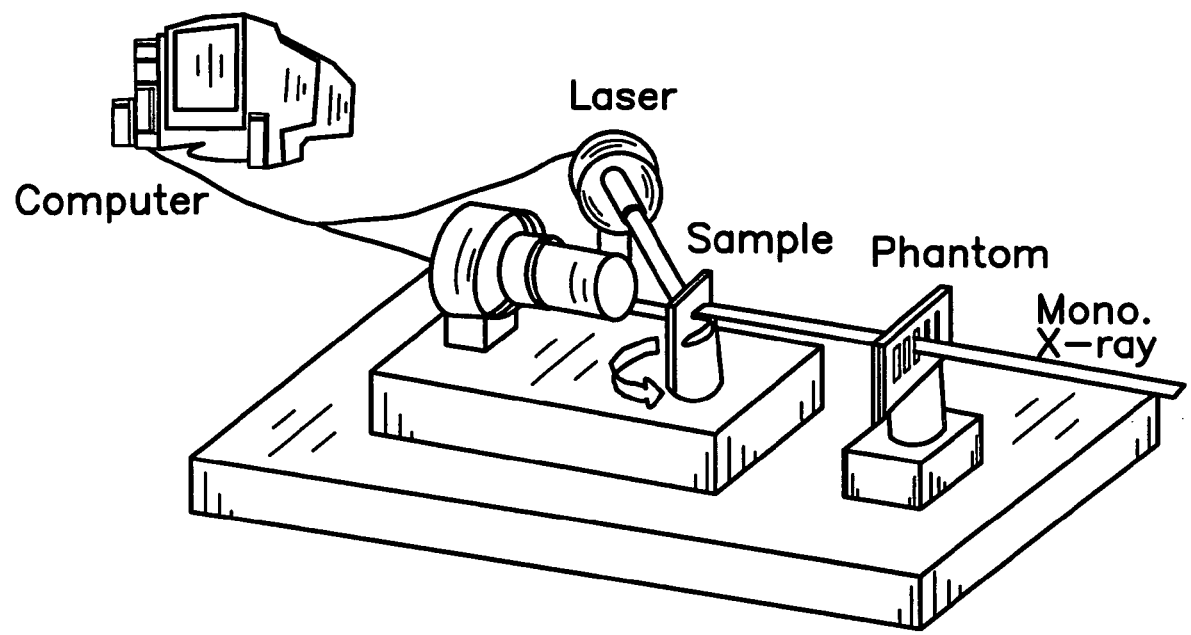
FIG. 1 is a prior art experimental setup of the x-ray imaging system for testing the FCZ glass-ceramic plates.

Storage phosphor materials of transparent glass ceramics were tested using collimated x-ray beams and high-resolution imaging to:

Characterize glass plates for particle composition and size by x-ray diffraction (XRD), Determine the charge state of the doped europium by x-ray absorption near edge structure (XANES), Measure the spatial resolution (modulation transfer function), and Identify the requirements to optimize glass properties for storage phosphor applications.

The invention includes novel glass materials that advance radiographic electronic imaging. The materials have superior resolution to existing polycrystalline x-ray imaging systems, and they provide high x-ray conversion efficiency.

The inventors fabricated ZBLAN glass-ceramic plates, co-doped with chlorine or bromine and heat-treated under a variety of conditions. These compositions were chosen because they show a significant room-temperature photostimulated luminescence (PSL) effect. To understand the structure-property relations with a view to optimizing these materials as high-efficiency and high-resolution storage phosphors, we performed x-ray imaging measurements and structural characterization. The transparent ZBLAN-based imaging plates have resolution superior to what is commercially available. Also, modifying the structure and controlling the thermal processing of the sample further improves their efficiency.

A significant PSL effect has been found in europium (II)-doped fluorozirconate glasses (ZBLAN), which were additionally doped with $Br^-$ ions. The PSL is attributed to the characteristic 5d-4f emission of $Eu^{2+}$ present in nanocrystals of $BaBr_2$ or $BaCl_2$, which form in the glass upon annealing. Surprisingly, the metastable hexagonal form of $BaX_2$ (X=Br, Cl) is always formed first before it is converted into the stable orthorhombic form. The particle size increases upon annealing and so does the PSL efficiency of the glass ceramic. However, there is a saturation of the PSL efficiency, which is 9% for $Br^-$-doping and 80% for $Cl^-$ doping of the Eu-doped BaFBr standard. There is a clear tendency for bigger but fewer particles for longer annealing. The particle size for the most efficient phosphor is about 100 nm. Comparing the PSL properties of the Eu-doped $BaX_2$ nanocrystals and those of bulk $BaX_2$ single crystals shows that most of the properties are quite similar. However, taking into account that the volume fraction of the nanocrystals is at most 20% of the glass ceramics, the PSL efficiency exceeds that of the bulk material by a factor of about five. An important issue for the readout process in glass-ceramic imaging plates is transparency, and in all systems there is a trade-off between PSL efficiency and transparency. The PSL increases and the transparency decreases with crystallite size.

Sample Preparation

The fluorobromozirconate (FBZ) glasses are derived from a modified fluorozirconate composition (ZBLAN20), which is known for its high stability against devitrification and is comprised of $(53-x)ZrF_4$, $20BaF_2$, $5NaF$, $15NaBr$, $3AlF_3$, $1.5LaF_3$, $1.5YF_3$, $1InF_3$, and $xEuF_2$ (values are in mol %), where the nominal content of the substituted $Br^-$ ions is about 5% of the total number of anions.

For the fluorochlorozirconate (FCZ) glasses the nominal content of the substituted $Cl^-$ ions is close to 14% of the total number of anions with a nominal composition of $(53-x)ZrF_4$, $10BaF_2$, $10BaCl_2$, $20NaCl$, $3.5LaF_3$, $3AlF_3$, $0.5InF_3$, and $xEuF_2$ (in mole percent); the actual $Cl^-$ content could be lower due to chlorine evaporation during the heating cycle and thus the preferred chlorine ion content is in the range from about 10% to about 20% of the total number of anions. Two sets of FCZ glasses were fabricated: one set had the same composition as indicated above, and the other was doped with an extra 2-mol % of $NH_4HF_2$ (ABF). The two sets of FCZ glasses were made from the same batch of raw metal fluorides. The first set was melted and quenched. The second set was melted, quenched, crushed, and doped with ABF, and then melted and quenched again.

The above constituent chemicals were melted in a glassy carbon crucible at 740° C. in an inert atmosphere of nitrogen and then poured into a brass mold, which was at a temperature below the glass transition temperature of 260° C. The as-made FBZ and FCZ glasses were subsequently annealed at temperatures between 200° C. and 295° C. for various times in an atmosphere of nitrogen, then slowly cooled to room temperature. The initial glasses were clear, but after annealing there was evidence of crystallization in all the glasses, from near-transparent materials to opaque and milky. The former behavior is consistent with Rayleigh scattering expected for a semi-transparent glass ceramic.

X-ray Imaging Performance at APS

X-ray imaging tests on FCZ imaging plates were performed at the 2-BM beamline of the Advanced Photon Source (Argonne National Laboratory, Argonne, Ill., USA). FIG. 1 shows the experimental setup. A 4 mm (horizontal)×2 mm (vertical) monochromatic x-ray beam was used as an imaging light source. A Huettner phantom or a GaAs knife-edge was used as an imaging object for measuring the modulation transfer function (MTF) of the imaging plates. (The MTF is a measure of the relative contrast of an imaging system as a function of spatial frequency.) The Huettner phantom has a series of parallel gold bars with spatial frequencies up to 20 line pairs per mm (25 micrometer per bar).

Although the high-resolution imaging system used in these experiments was not representative of the laser point scan system is used in the application of these materials to radiographic imaging or mammography, it is still useful to demonstrate the lack of geometrical blur in the materials, and directly illustrates the high potential for other imaging applications using the inventive plates.

An x-ray image of the phantom was projected on the sample (imaging plate), which was mounted on a rotation stage with X, Y, and Z motion control. The formed x-ray image on the sample was captured by a thermal-electrically cooled charge-coupled device (CCD) camera through 5× or 2.5× objective lenses. This setup was used for both storage phosphor and scintillation samples. In the case of scintillators, x-rays are continuously incident on the sample. An image of the phantom was formed instantly on the sample and taken by the CCD camera through the objective lens. In the case of storage phosphors, the exposure time of the incident x-rays (typically a few seconds) was controlled by an x-ray shutter. After exposure to x-rays, the sample was rotated by 180° and was illuminated by a laser beam (660 nm wavelength). The laser beam was larger than the x-ray beam so that the whole x-ray illuminated region on the sample was exposed by the laser beam. The "latent image" in the storage phosphor sample was then read out by the laser illumination, and the formed image was taken by the CCD camera through the objective lens. An optical filter was placed between the CCD camera and the objective lens to block scattered laser light but to let the stimulated luminescence light pass through. The laser beam was synchronized with the CCD camera so that the shutter of the camera was open while the laser was running.

Figure 2A:
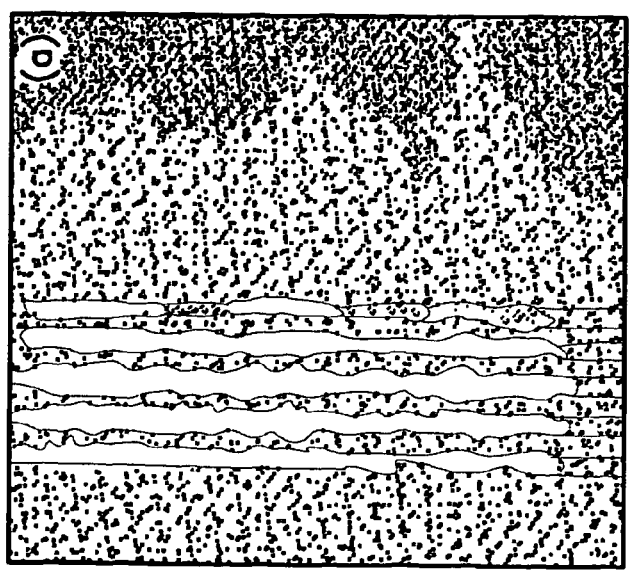
FIG. 2(a) is a photostiumulated luminescence (PSL) image of parallel gold bars (13 lp/mmm in spatial frequency) recorded on a 2% Eu-doped FCZ glass-ceramic plate annealed at 285° C. for 20 min., in which the horizontal stripes are caused by intensity variation of the x-ray beam having x-ray energy of 17 keV.
Figure 2B:
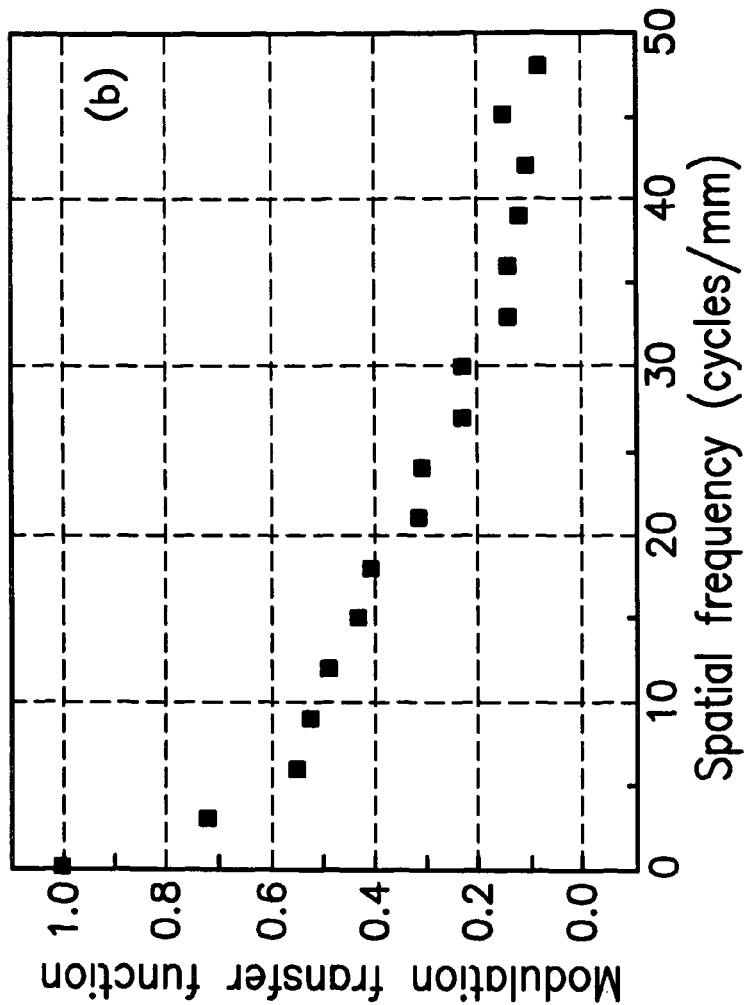
FIG. 2(b) is a graphical representation of the modulation transfer function calculated from the photostimulated luminescence image of FIG. 1.

The spatial resolution of the FCZ glass-ceramic storage phosphors was tested with a Huettner grid phantom as described above. FIG. 2a shows the PSL image of the 13 lp/mm parallel bars recorded on a 2% Eu-doped FCZ glass-ceramic plate annealed at 285° C. for 20 min. The sample and the phantom were exposed to a monochromatic 17 keV x-ray beam for 5 sec, and then read out for 10 sec with a laser diode. The image clearly resolves the 13 lp/mm and should be able to resolve even finer features than that.

We used the data from FIG. 2a to calculate the MTF of the sample. The resolution is defined as the value of the spatial resolution at a certain MTF value. The resolution of the 2% Eu-doped FCZ glass-ceramic plate was about 30 lp/mm at an MTF of 0.2. That means this imaging plate resolves features as small as 17 micrometer. This value is astonishing for a flash readout. Furthermore, point-by-point scanning of a 1% Eu-doped FCZ glass ceramic showed that an even higher resolution is possible.

We ran several tens of PSL tests on the best of the PSL-active samples and did not observe any degradation or decrease in the PSL efficiency. The results were completely reproducible. The stability of the PSL-active defects is comparable to that of commercially used Eu-doped BaFBr, i.e. storing an x-irradiated sample in the dark leads to a decrease in the PSL efficiency of 50% in the first 10 hours after exposure. In Eu-doped BaFBr the half time of the dark decay ("fading") is about 24 hours.

Structural Characterization at APS

Figures 3A, 3B:
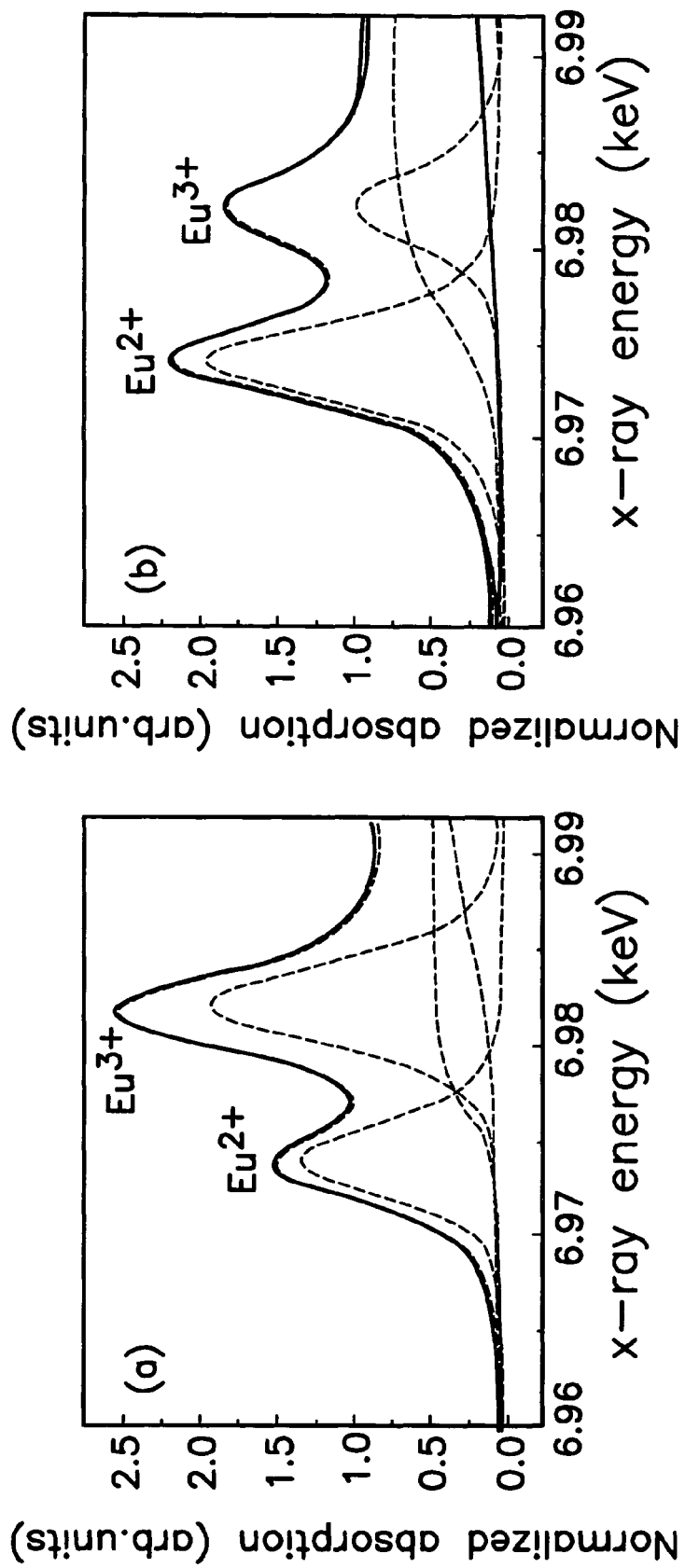
FIG. 3(a) is a graphical representation of Eu L-III XANES spectra of FCZ glasses without ABF.
FIG. 3(b) is a graphical representation of Eu L-III XANES spectra of FCZ glasses with 2-mol % ABF doping.

FIG. 3 shows the normalized Eu L-III XANES spectrum (solid curve) of an as-made 1% Eu-doped FCZ glass-ceramic. Two peaks can be clearly seen, at about 6.974 keV and 6.982 keV. They are caused by the $2p_{3/2} \rightarrow 5d$ electronic transition, and they are characteristic white lines of $Eu^{2+}$ and $Eu^{3+}$. The intensity ratio of these white lines indicates the $Eu^{2+}$:$Eu^{3+}$ ratio. For the quantitative analysis, a pseudo-Voigt and an arctan function were used to fit each white line and the absorption edge, respectively. The quantitative analysis of the white lines yielded a $Eu^{2+}$: $Eu^{3+}$ ratio of 1:1.

It was quite surprising that such a high fraction of $Eu^{3+}$ (50%) was found in the as-made FCZ sample, since Eu was added to the glass as $Eu^{2+}$. One or more of the raw metal fluorides may contain a small amount of oxygen, which can oxidize $Eu^{2+}$ to $Eu^{3+}$ before and/or during glass melting. Atmospheric contamination of the $EuF_2$ raw material may also have converted a part of the $EuF_2$ to $Eu_2O_3$. Traditionally, in fluoride glass fabrication, when the quality of metal fluorides is not very high (i.e., contaminated by $O^{2-}$), ammonium bifluoride (ABF) is used to fluorinate the oxides. Doping the FCZ samples with ABF reduces the $O^{2-}$ concentration and converts directly and/or indirectly a part of the $Eu^{3+}$ back to $Eu^{2+}$. The XANES spectrum of the as-made Eu-doped FCZ glass ceramic doped with ABF (FIG. 3b) indicates that the $Eu^{2+}:Eu^{3+}$ ratio changed significantly in favor of the $Eu^{2+}$; it increased to about 3:1.

Figure 4B:
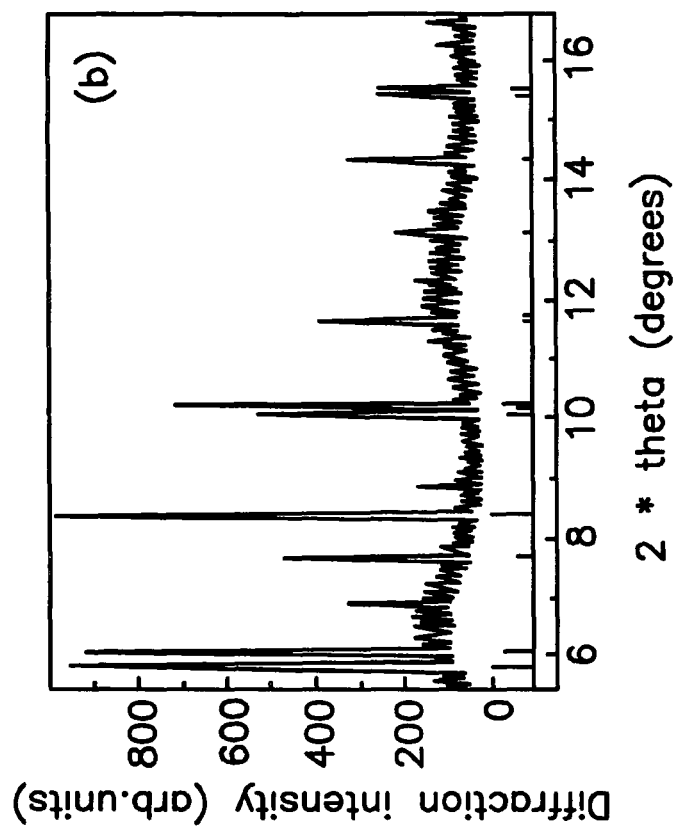
FIG. 4(b) is a graphical representation of XRD patterns of an ABF doped FCZ glass annealed at 290° C. for 20 min.
Figure 4A:
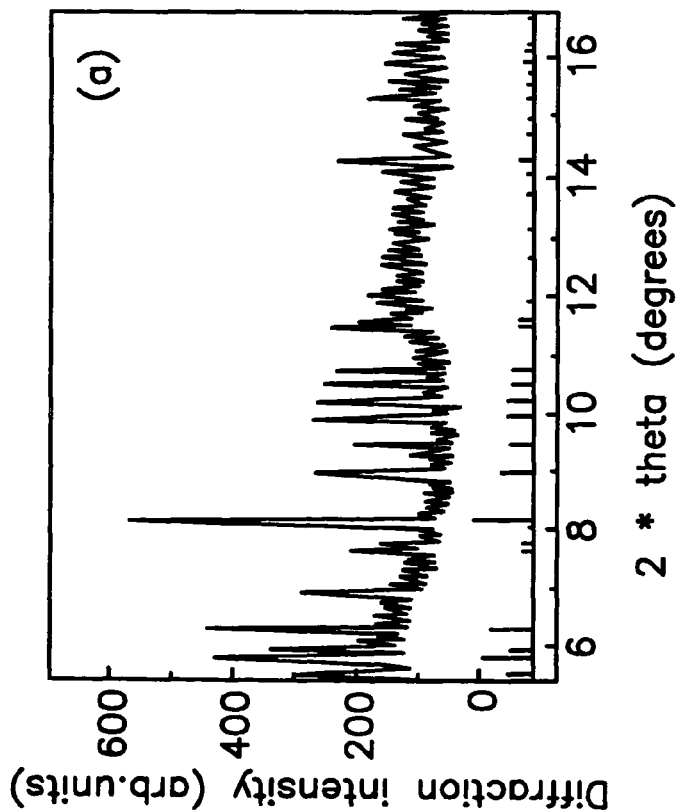
FIG. 4(a) is a graphical representation of XRD patterns of an ABF undoped FCZ glass annealed at 280° C. for 20 min.

ABF doping also has a critical effect on the phase transition induced by annealing of the as-made FCZ glasses. FIG. 4a shows the XRD pattern of the ABF-undoped FCZ glass ceramic annealed at 280° C. for 20 min. The pattern for the orthorhombic $BaCl_2$ phase (Powder Diffraction File 24-0094) is shown for comparison at the bottom. The asterisks indicate an unidentified X phase with hexagonal symmetry. The estimated average crystal size is 140 nm for the orthorhombic $BaCl_2$ phase and 110 nm for the X phase (obtained from the XRD line-width analysis). The XRD patterns of the ABF-undoped samples in this study are consistent with those reported previously. A phase transition (from hexagonal to orthorhombic $BaCl_2$) occurs at and above 270° C., accompanied by the appearance of efficient storage-phosphor behavior.

The ABF-doped samples do not have the same XRD patterns as those of the undoped samples. The ABF-doped FCZ glass ceramics annealed at 270° C., 280° C., and 290° C. for 10-20 min do NOT show the orthorhombic $BaCl_2$ phase. FIG. 4b shows the XRD pattern of the ABF-doped glass annealed at 290° C. for 20 min; the bottom pattern shows the data for the hexagonal $BaCl_2$ phase (PDF 45-1313) for comparison. Surprisingly, only the dominant hexagonal $BaCl_2$ phase and the minor unidentified X phase form during annealing of the ABF-doped glass at and above 270° C. In FIG. 4b, the estimated average crystal size is 520 nm for the hexagonal $BaCl_2$ phase and 490 nm for the X phase. The ABF-doped glass ceramics are very poor storage phosphors (over two orders of magnitude lower in efficiency than their undoped counterparts), as confirmed by PSL measurements.

It is known that the PSL efficiency of the Eu-doped FBZ and FCZ glass ceramics is intimately related to the formation of orthorhombic $BaCl_2$ and $BaBr_2$ phases, respectively. The XANES and XRD analyses on undoped and ABF-doped FCZ glasses and glass ceramics showed that oxygen impurities might play a critical role in precipitating the orthorhombic $BaCl_2$ nanocrystals. The effect of oxygen could be twofold: First, oxygen results in many nucleation centers and causes rapid crystallization, which helps to form "imperfect" nanocrystals with vacancies and/or grain boundary segments. Such lattice defects are important for trapping electrons and holes that are created by the x-ray photons and important for the PSL process. Second, divalent oxygen impurities in the barium halide crystallites are probably charge-compensated by anion vacancies in the lattice, which can act as electron trap centers (F centers) and thus increase the PSL efficiency. This is well known from the commercial storage phosphor BaFBr:Eu.

A number of experiments were performed to measure materials and engineering parameters relevant to a point scanning readout system, and to allow projection of the Detective Quantum Efficiency (DQE) for the inventive detector system. These included measurement of the required stimulating exposure (laser power density×pixel dwell time), and integrated PSL signal (or "gain", expressed as the number of detected electrons per absorbed x-ray). Measurements of optical light spreading of the stimulating laser light were also done, since this effect determines the MTF of the scanning system. Calculations of x-ray absorption vs. imaging plate composition and thickness, and x-ray beam spectrum, were also completed. Finally, the measured parameters were used to project DQE vs. spatial frequency for the inventive detector, and to compare with commercially available electronic mammography systems.

Figure 5:
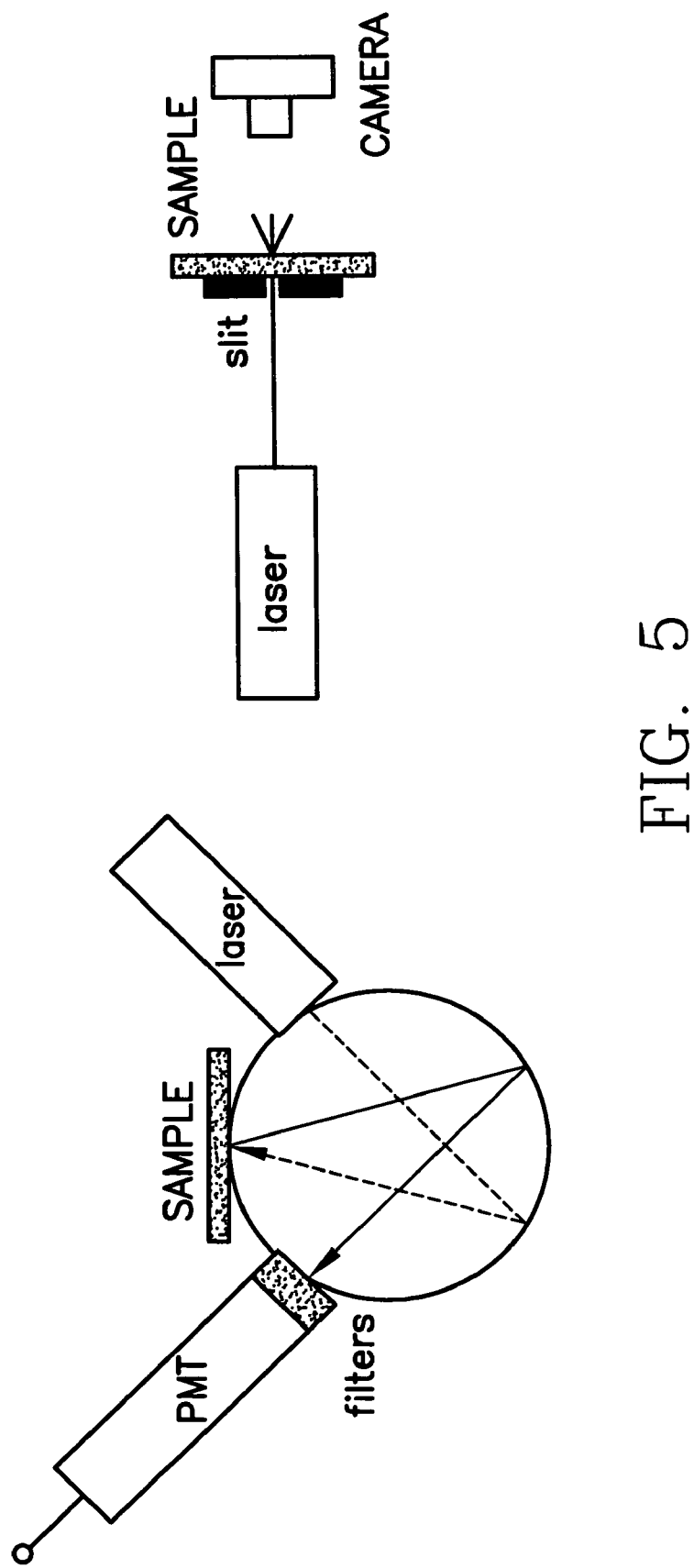
FIG. 5 shows the setup for measuring the PSL decay curves shown in Figure and the optical line spread functions shown in FIG. 7.

A PSL measurement system consisting of an integrating sphere, diode laser light source (656 nm), optical filters (BG3—blue, BG39—blue, FDIP—blue dichroic), and photomultiplier tube (PMT—Hamamatsu R6095), was assembled (FIG. 5).

Figure 6B:
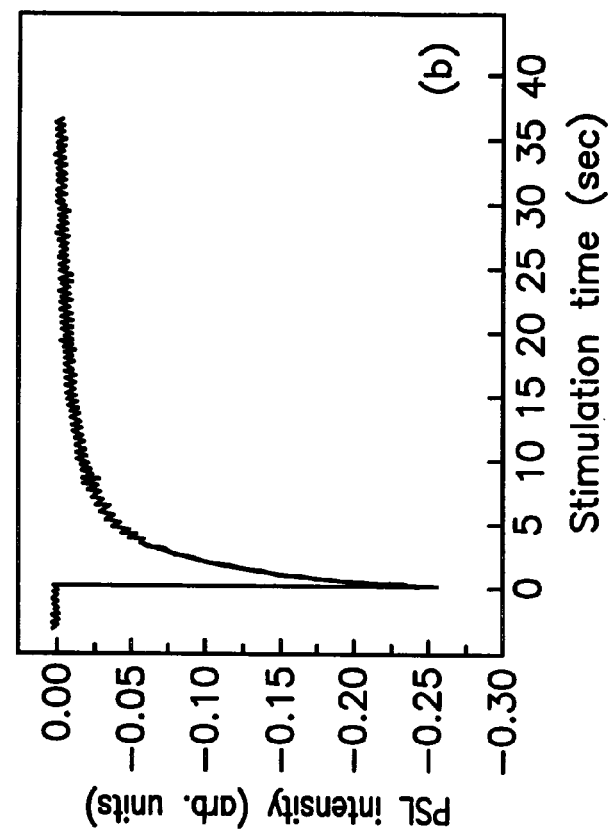
FIG. 6b is a graphical representation of PSL signal decay for comparison sample.
Figure 6A:
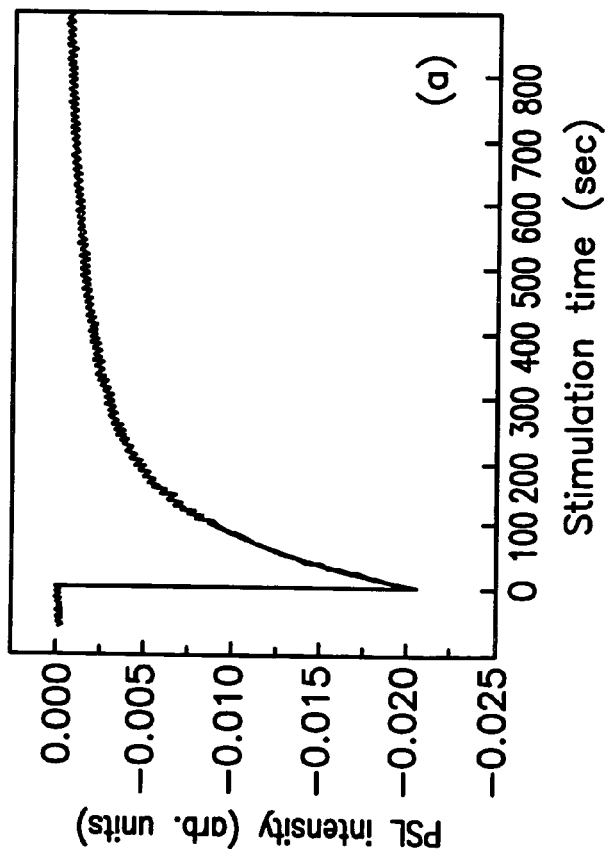
FIG. 6a is a graphical representation of an PSL signal decay for a FCZ glass-ceramic sample annealed a 290° C. for 20 mins.

Samples were erased, given a known x-ray exposure, and placed on the entrance port of the integrating sphere, in the dark. After the laser was turned on, the resulting PSL signal, S, was observed to decay with stimulation time, t, and the data was recorded with a digital oscilloscope. The area under the PSL S vs. t curve is proportional to the number of detected electrons per absorbed x-ray, which we call g, see FIG. 6. The source intensity at the sample port multiplied by the observed decay time gives the exposure required for stimulation, which we call 1/a. The PSL signal decay was also measured for a commercial $BaFBr:Eu^{2+}$ CR screen, for which the values of g and a are known under the same conditions. The gain g for ZBLAN samples of different thicknesses varied between 13% and 28% for the samples studied, corrected for differences in x-ray absorption. Since the net gain (after stimulation, collection, and detection) in a commercial scanner using the BaFBr imaging plate is about 5.5, the gain g for the second ZBLAN sample would be about 1.5, in a scanner of conventional design, and 3.0 in the proposed scanner system with improved light collector design.

Figure 7B:
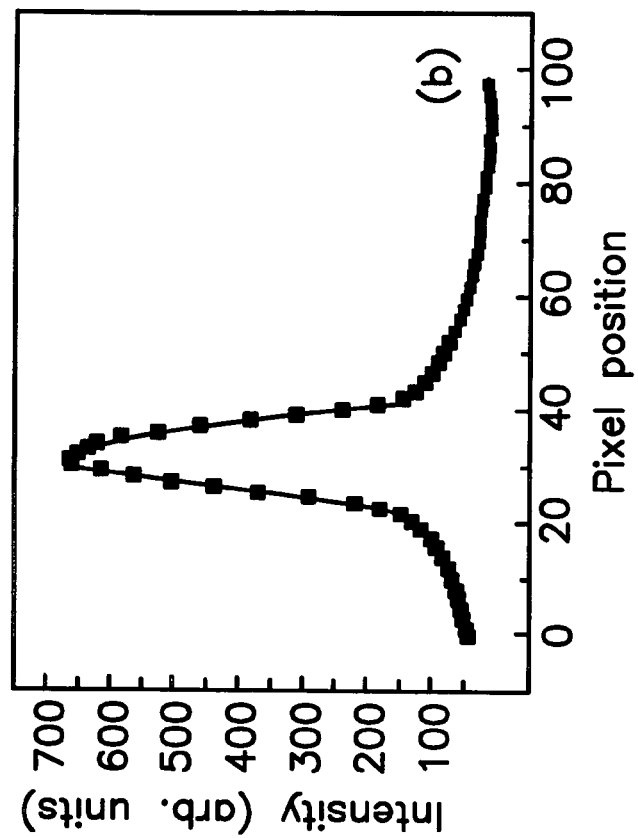
FIG. 7b is a graphical representation of a line spread function for comparison sample.
Figure 7A:
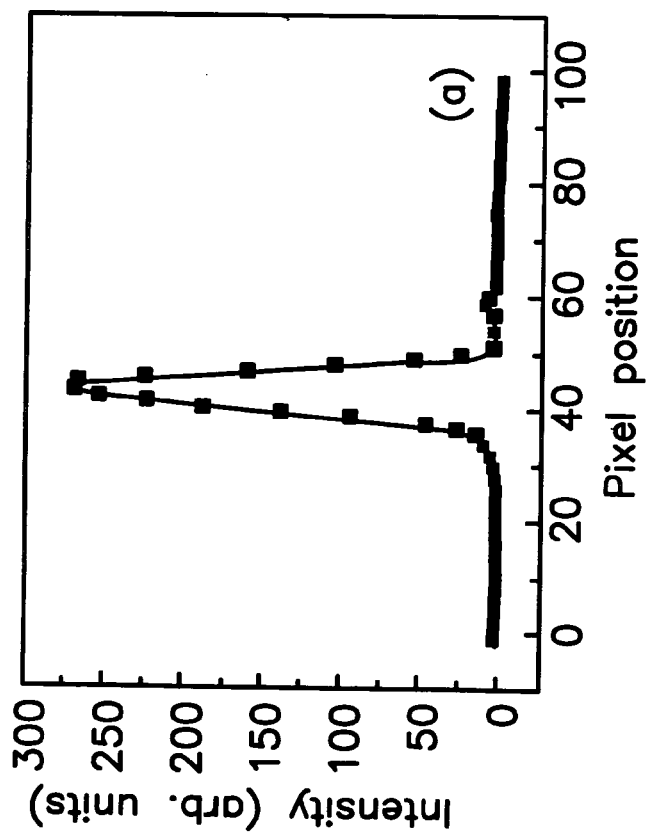
FIG. 7a is a graphical representation of a line spread function for FCZ glass-ceramic sample annealed at 290° C. for 20 mins.

Measurements of optical line spreading were done, using a (650 nm) laser source, to confirm the expectation of very high system MTF in the point-scanning mode, see FIG. 7. The laser source was directed through a narrow optical slit in contact with the sample, and the line spread function (LSF) of the light emerging from the backside of the sample was recorded using a digital camera. (The experiments were also done using an edge source, with the same final results.) The measurement was done with a 1 mm thick ZBLAN sample, and also with a commercial mammography screen (LANEX Fine) sample, for which the x-ray LSF and MTF are known. The screen comparison LSF can be described by an exponential function exp(−bx), where b is 42 microns. The ZBLAN optical line spreading was observed to be smaller than the comparison, and b is estimated at 10 microns or less. Thus the LSF and MTF in a point scan system using a ZBLAN imaging plate will be determined mainly by the input scanning beam diameter, which can be adjusted to provide an optimal tradeoff between sharpness and (slow-scan) aliasing.

Figures 8A, 8B, 8C, 8D:
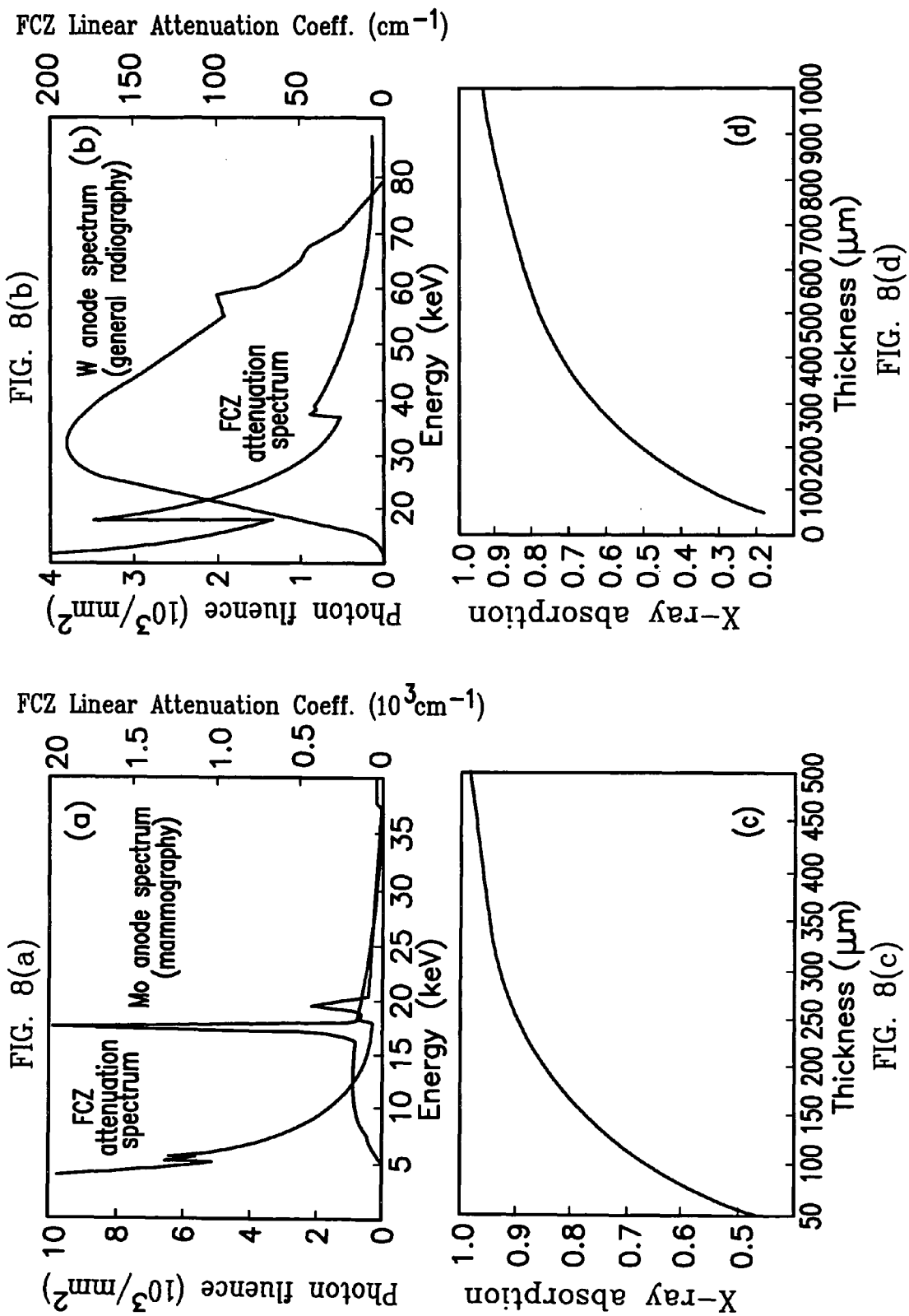
FIG. 8a is a graphical representation of ZBLAN attenuation and Mo anode x-ray spectrum.
FIG. 8b is a graphical representation of ZBLAN attenuation and W anode x-ray spectrum.
FIG. 8c is a graphical representation of ZBLAN x-ray spectrum absorption vs. thickness for Mo spectrum.
FIG. 8d is a graphical representation of ZBLAN x-ray absorption vs. thickness for W spectrum.

The mass attenuation coefficient for the ZBLAN material was calculated vs. x-ray energy, from its atomic composition, and is shown in FIGS. 8a and b, along with x-ray spectra relevant to mammography (Mo anode, 40 kVp) and general radiography (W anode, 80 kVp).

For the mammography (Mo anode) case, ZBLAN plates of 300 microns or thicker give a quantum absorption efficiency of >90% (FIG. 8c). For the higher kVp spectrum, thicker ZBLAN plates (500 microns or more) would be used (FIG. 8d).

A simple SNR model was used to project the DQE vs. spatial frequency which could be obtained in a point scan system, using the measured properties of the ZBLAN imaging plates. The inputs are the x-ray absorption a, the excess noise factor $A_S$, the gain g, and the MTF. Further electronic noise sources can be safely neglected, because of the large signal amplification supplied by the photomultiplier tube used for light detection. The LSF is characterized in the model by a parameter b in an exponential function, thus the MTF is a Lorentzian:

$$MTF = \frac{1}{1+f^2/b^2}$$

Figure 9:
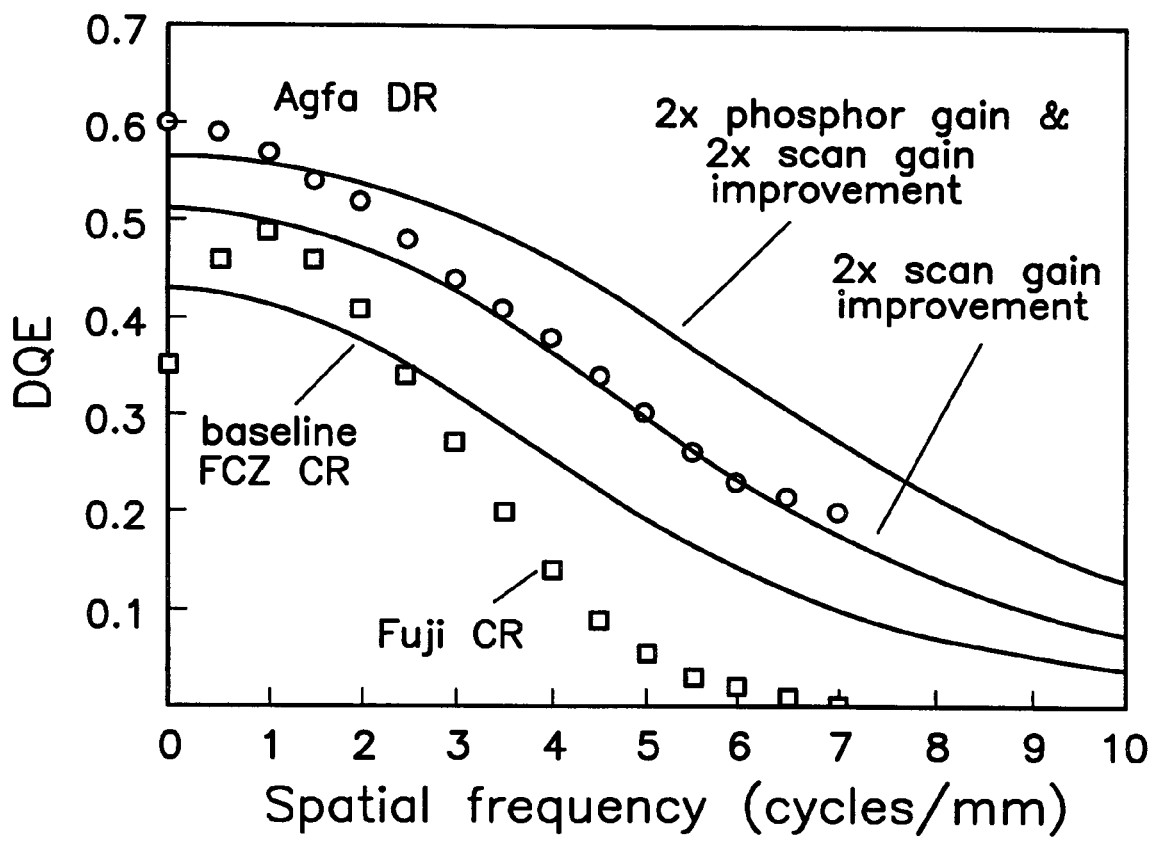
FIG. 9 is a graphical representation of a projected DQE of proposed mammography system.

The absorption was calculated for a 300-micron plate and mammography spectrum, and was found to be 90%. The excess noise factor is conservatively estimated to be similar to that for a conventional BaFBr CR screen, and is taken as 0.7 (although one expects an improvement in excess noise in a transparent material because of the lack of optical depth effects.) The "baseline" gain is taken as 1.5, corresponding to a measured sample of a ZBLAN plate in a conventional (50 micron) point scanner. Two other cases are considered: g=3.0, corresponding to the improved efficiency light collector design, and g=6.0, corresponding to an anticipated 2× improvement in gain from materials optimization. The parameter, b, characterizing the MTF was taken as 70 microns ($1/e^2$ beam diameter), in order to minimize noise aliasing in the slow-scan direction, in a point scanner with 50 microns pitch. Temporal filtration via an electronic low-pass filter is used in the fast-scan direction, so that there is little or no noise aliasing in this direction. (We also note that the luminescence lifetime of the ZBLAN material in PSL mode was found to be 840 ns, so luminescence decay should be a negligible contributor to point scan MTF at the readout rates that are expected.) The results of the DQE projections are shown in FIG. 9, and are compared with published DQE data for a commercial CR mammography system (MHRA 04094, "CR Systems for Mammography, Fuji FCR 5000MA, and FCR Profect CS", UK Department of Health, 2004), and a commercial DR mammography system (Agfa DM1000 DR Mammography System, Agfa Health Care, 2006).

The "baseline" DQE of the ZBLAN point scan system, assuming a conventional scanner design, is projected to have better DQE than the commercial CR system at high spatial frequencies, but somewhat worse performance at low (2 cycles/mm or less) frequencies. The ZBLAN system with the improved scanner design surpasses the commercial CR at all frequencies, and approaches DR performance at high spatial frequencies. A further 2× improvement using the inventive materials results in a system with comparable or better performance than commercial DR (at lower cost) and improved signal-to-noise ratio at higher spatial frequencies. Previous studies have suggested that dose reduction compared to screen film mammography may be possible in commercial DR systems, but have indicated a concern about reduction in the visibility of microcalcifications because of increased noise. This problem is alleviated in the inventive system, which has improved signal-to-noise at higher spatial resolutions.

Scaled-Up Production of Glass Plates

The glass formulations are based on the strong glass network former zirconium fluoride ($ZrF_4$) that readily forms glass. So far, the glasses were produced on a small laboratory scale and the processing technology and optical quality of the products were not optimized for mammography applications. Samples made on a small scale typically contain flow lines, cords, and laps that can limit their optical performance.

Several optical quality glass plates approximately 2×2 $cm^2$ in size have been made. The plates made are ¼ the size of the ultimate target dimensions of 24×30 $cm^2$ that constitute the full size mammography plates.

Due to the potential for reaction and hydrolysis of the finely divided metal fluoride starting materials, the materials are handled in a controlled atmosphere glove box. High purity reagent grade materials (from Alfa-Aesar, Aldrich Chemical Company and Cerac, Incorporated) are used for the production of glasses. The precursor materials are weighed, blended, and melted in covered glassy carbon or platinum crucibles. The loaded crucibles are covered with a close fitting lid, placed in an electric furnace and heated to a temperature close to 740° C. to achieve complete melting of the mixture. The melts are held for periods of approximately 60 minutes. In some cases, the melt can be stirred by bubbling gas through a platinum capillary tube inserted through the crucible lid. In all cases, the melt will be fined to remove bubbles. The resulting liquid is cast into brass dies held at a temperature of ca. 200° C., slightly below the glass transition temperature of the glasses. The molds are heated either by equilibrating them with a surface contact heater or by cartridge heaters embedded in the die to enable introduction of controlled temperature gradients into the molds.

One problem in large scale production of ZBLAN based glass materials was identified and solved on a laboratory scale in the earlier work is the need to avoid reduction of zirconium tetrafluoride to lower fluorides. When reduction occurs, dark-colored precipitates can form in the glass. The principal mechanism of reduction of zirconium ions is: $ZrF_4 + nEuF_2 = ZrF_{4-n} + nEuF_3$, the reaction also consumes the desirable divalent europium species (other highly reducing species can also reduce zirconium tetrafluoride). The reaction can be suppressed by operating in oxidizing conditions. Further, decreasing the duration of melt processing limits the degree of reaction since the kinetics are known to be fairly slow. The second issue in glass melting is reactive gasification of zirconium. This can occur by an exchange reaction: $ZrF_4 + 4Cl^- = ZrCl_4 + 4F^-$ that leads to formation of volatile zirconium chloride. This reaction cannot be completely avoided when chlorides are present in the melt but its effect can be limited by using short melting times. Alternatively, the base glass can be melted before the addition of the chloride species. Working in a closed crucible helps to retard evaporation.

The cast glass plates were heat treated to develop the nanophase species that provide the PSL response. Heat treatment was performed directly in the mold by increasing the power to the heaters or in a separate operation using a low temperature furnace. The heat treated plates were inspected for bulk and surface defects.

All glasses underwent Differential Scanning Calorimetry (DSC) to measure the glass transition temperature and crystallization temperatures of the materials and establish the "working range", which is between the two. Thermal treatment schedules required to produce desirable microstructures in the materials were derived from these results.

The transmission spectrum of the glasses was measured in the wavelength range from 200-1200 nm using a Varian Cary 500 dual-beam spectrophotometer. The results were analyzed to determine the precise spectral band where maximum absorption occurs.

X-ray diffraction (XRD) was carried out on a bench-top system and at a synchrotron facility for better resolution. Increased stress comes about when the particles grow during thermal processing and undergo a phase change from hexagonal to orthorhombic. More stress creates more defects, and correspondingly the PSL increases. XRD is an important technique in the characterization of these materials.

Figure 10:
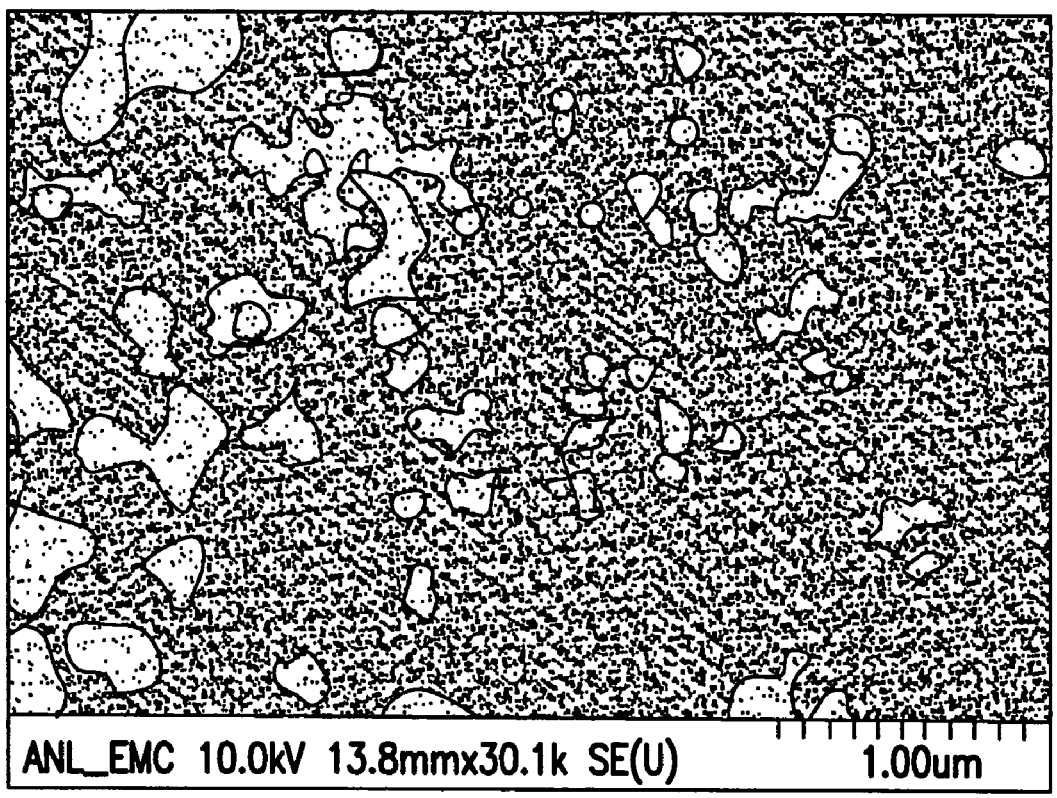
FIG. 10 is an SEM image of a 2% $Eu^{2+}$-doped FCZ plate annealed at 285° C. for 20 min, revealing nanophase crystals (about 100 nm in average size) embedded in a glass matrix.

X-ray Absorption Fine Structure (XAFS) experiments and EXAFS (Extended X-ray Absorption Fine Structure) were used to determine the structural distribution, for example inter-atomic distances, numbers of neighboring atoms (coordination number), degree of disorder, and identity of atoms in the immediate vicinity (approximately 5 Å). XANES (X-ray Absorption Near Edge Structure) is a subset of XAFS and is element specific; our experiments have focused on Eu, the optically active element in our inventive materials. Preliminary results have given the valence of the Eu, i.e. whether it is 2+ or 3+ and has given us an indication of the PSL efficiency. $Eu^{3+}$ is an indicator of the presence of oxygen impurities, which create defects. These defects enhance the PSL efficiency. Microscopy established size, shape and distribution of the nanocrystals in the glass matrix, see FIG. 10, a SEM of a 2% $Eu^{2+}$ doped FCZ plate.

After making the first set of FCZ glass ceramics (starting with the standard composition) the samples were characterized in terms of glass transition temperature (DSC), nanoparticle size and phase (XRD, SEM, TEM), and optical properties (PL, transmission). The PSL efficiency and stimulating exposure requirement were measured using a PSL decay apparatus, while the transparency at the stimulating wavelength and optical scattering at the emitted wavelength were monitored by transmission spectrophotometry.

A bench top read-out system was used to measure the imaging properties of the plates in detail, including characteristic curve, MTF, and noise power spectrum, from which DQE was obtained. A Gioto screen film mammography system, with Mo tube target and Mo and Rh filtration was used to expose the plates. The exposures tested spanned a range corresponding to patient doses equivalent to and above and below the patient dose in screen film mammography. The measured DQE was compared with model predictions, and the correlation between measured PSL properties and imaging performance (DQE) was tested and refined.

As the optical and PSL properties and imaging performance were being measured, quantified, and modeled, the sample composition was varied. The base composition set to be studied was guided by the fundamental structural investigations of the glass materials. The relationships between composition, structure and processing and both measured PSL activity and imaging performance were established and quantified. Initially, the chlorine doping level was increased in order to increase the volume fraction of the PSL-active barium chloride nanoparticles in the glass. Secondly, the Eu (II) doping level was increased and anion vacancies introduced by co-doping the glass with monovalent cations like $K^+$ and/or divalent anions like $O^{2-}$.

Figure 11:
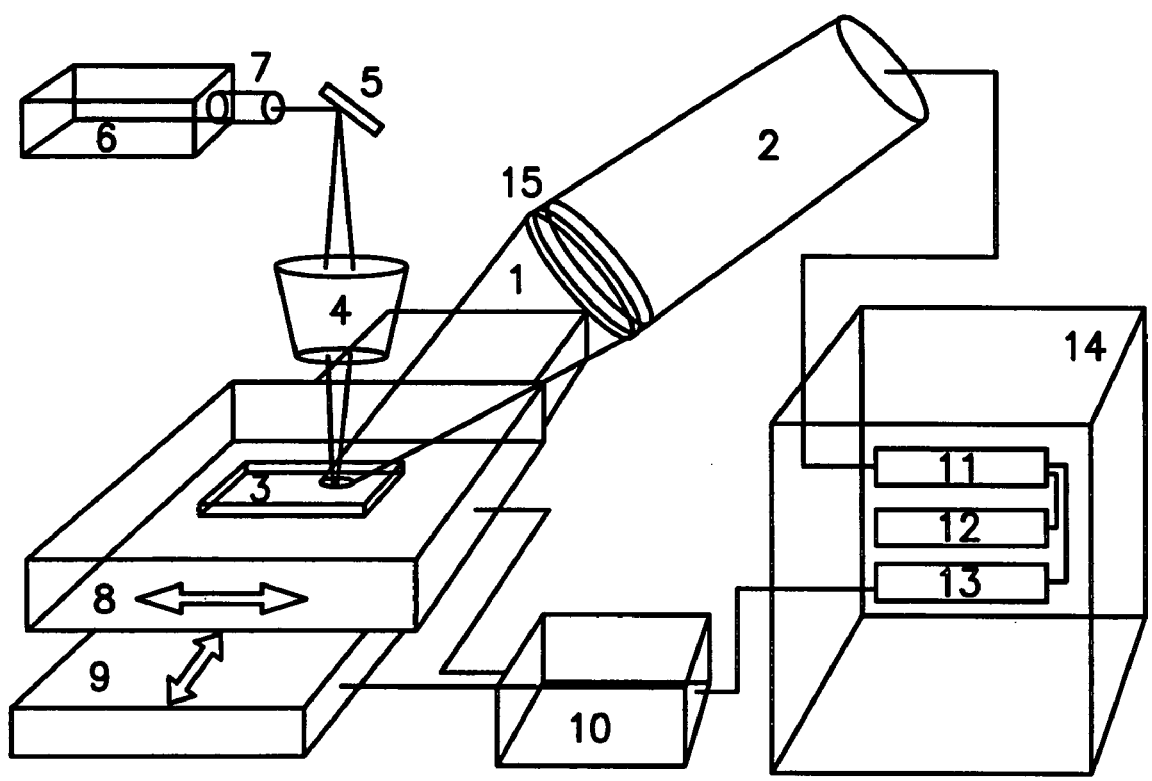
FIG. 11 is a graphical illustration of a first embodiment of the present invention shown in the form of a portable, self-contained device in a light-tight box

Referring to FIG. 11, a first embodiment of the inventive system is shown. It is in the form of a portable, self-contained device, in a light-tight box shown in dotted line. Exposed photostimulable plates (3) are read out using the light from source (6), which may be a laser source. The stimulating light passes through a beam expander (7) and reflects from a folding mirror (5). The stimulating light beam is focused to the desired beam size at the imaging plate surface by the objective lens (4). The stimulating beam enters the imaging plate (3) in a direction perpendicular to the plate surface.

The stimulating beam, upon entering the imaging plate, stimulated stored electrons and holes to recombine, producing photostimulated luminescence light, which has a wavelength different from that of the stimulating slight. This light is collected by the light collector (1) and is directed towards a light detector (2). Before entering the detector (2), the light passes through an optical filter, such as the band pass (colored glass) filters (15), which remove the stimulating light but allow the luminescent signal light to pass through. The detector (2) may conveniently be a vacuum photomultiplier tube or multiples thereof. The signal from the detector (2) is passed to signal processing element (1), which comprises a charge amplifier and A/D converter which is synchronized with scan control element (13), and which writes signal data to the image buffer element (12). The image plate (3) is moved in the x and y directions with respect to the stimulating beam by the translation stages (8) and (9), whose motion is controlled by the dual motor controller (10). The motor controller (10) is driven by software in scan control element (13), which in turn may reside in a personal computer (14). The entire apparatus is enclosed in a light-tight box with a door for placing and removing sample plates (3).

The light collector (1) design is a key element. It is important to maximize luminescent signal collection and gain in order to maximize the signal-to-noise ratio of the radiographic imaging system. In the particular design in FIG. 11, the collector (1) is a cone with elliptical entrance port proximate the plate 3, and a slot for the stimulating beam entrance. The clearance between the elliptical entrance port and the image plate surface, and the beam entrance slot size are minimized in order to collect as many emitted luminescent photons as possible. The emitted photons generally have a wavelength between about 350 to about 495 nms. Using a specular mirror surface finish for the inside surface of the collection cone, we find, from ray tracing simulations, a collection efficiency of 78%, more than twice that obtained in a conventional prior art CR scanner using a light guide and mirror arrangement. The collection cone or light collector may be made from any suitable material such as, but not limited to, aluminum or plastic. The interior mirror surface must be reflective to the photons emitted from the plate 3 having wavelengths in the range from about 350 nms to about 495 nms, but always shorter than the laser or stimulating light. In addition, the side of the plate 3 away from the stimulating light 6 may be reflective to the PLL or to light with wavelengths in range from about 395 nms to about 495 nms. A further benefit is that "flare", which is stimulating light reflecting back to the plate from collector surfaces and causing image artifacts and reduced dynamic range, is minimized in the present system to be not greater than 1%. A HeNe laser from Coherent, Inc. producing 2 mW at 544 nm can be used as the light source 6, for example, although light at between about 500 and 750 nm can be used, but light with wavelengths in the range from about 500 to about 650 are preferred. The blue BG3 and BG39 bandpass filters from Schott glass can be used for optical filtration. The R878 bialkali photocathode PMT from Hamamatsu, Inc. has a 5 cm diameter for good collection, and the quantum efficiency is about 25% at 400 nm. Translation stages in x-y configuration with stepping motors and dual motor controllers are available from Newmark Systems, Inc. with a travel of up to 30 cm and resolution of 1 micron, which is small compared to the expected scan pitch of 50 microns, for the application of digital mammography. The size of the stimulating beam at the imaging plate surface can conveniently be adjusted to be in the range 50-100 microns.

Figure 12:
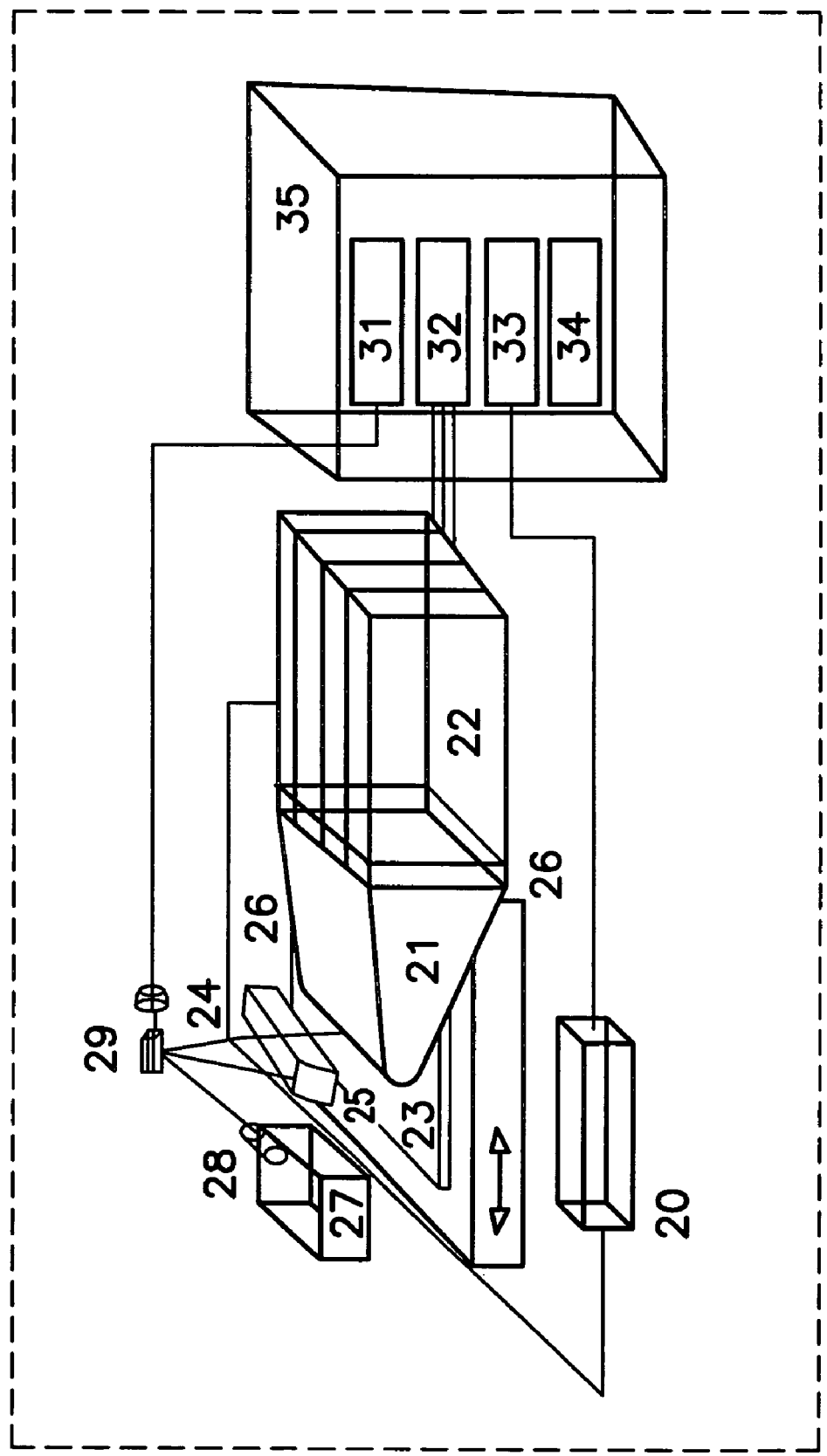
FIG. 12 is a graphical illustration of a second embodiment of the present invention shown in the form of a portable, self-contained device in a light-tight box.

Referring to FIG. 12, a second embodiment of the present invention is shown. It is in the form of a portable, self-contained device, in a light-tight box shown in dotted line. Exposed photostimulable plates (23) are read out using the light from source (27), which may be a laser source. The stimulating light passes through a beam expander (28) and reflects from galvanometer-driven rotating mirror (29), which comprises the light scanning element. The light beam reflected from the rotating mirror (29) then passes through the telecentric lens (24). The telecentric lens (24) must be equal or longer in length than the length of the scan line in the x direction. Lens (24) is telecentric in the image space, so that the principal rays emerge parallel to the optic axis, and thus enter the image plate (23) in a direction perpendicular to the plate surface. Lens (24) is further designed such that the stimulating beam is focused to a desired size at the plate surface, e.g. between 50 and 100 microns, for a 50 micron scan pitch.

The stimulating beam, upon entering the previously exposed to x-ray radiation imaging plate, stimulates stored electrons and holes to recombine, producing photostimulated luminescence light, which has a wavelength different from that of the stimulating light. This light is collected by reflecting mirror (25) and a trapezoidal light collector (21) and is directed towards a light detector (22). Before entering the detector (22), the light passes through the optical or band pass (colored glass) filters (26), which remove the stimulating light but allow the luminescent signal light to pass through. The detector (22) may conveniently be an array of photomultiplier tubes. The signals from the detector (22) are passed to signal processing element (31), which comprises a summing amplifier, a charge amplifier and A/D converter which is synchronized with scan control element (13), and which writes signal data to the image buffer element (32). The image plate (23) is moved in the y direction by the translation stage (26), whose motion is controlled by the motor controller (20). The scanning light beam is moved in the x direction by reflection from the galvanometer-driven rotating mirror (29), whose motion is controlled by the galvo control element (31). The motor controller (20) and the galvo controller (31) are driven by software in scan control element (33), which in turn may reside in a personal computer (34). The entire apparatus is enclosed in a light-tight box, shown in dotted line, with a door for placing and removing sample plates (33).

Figure 13A:
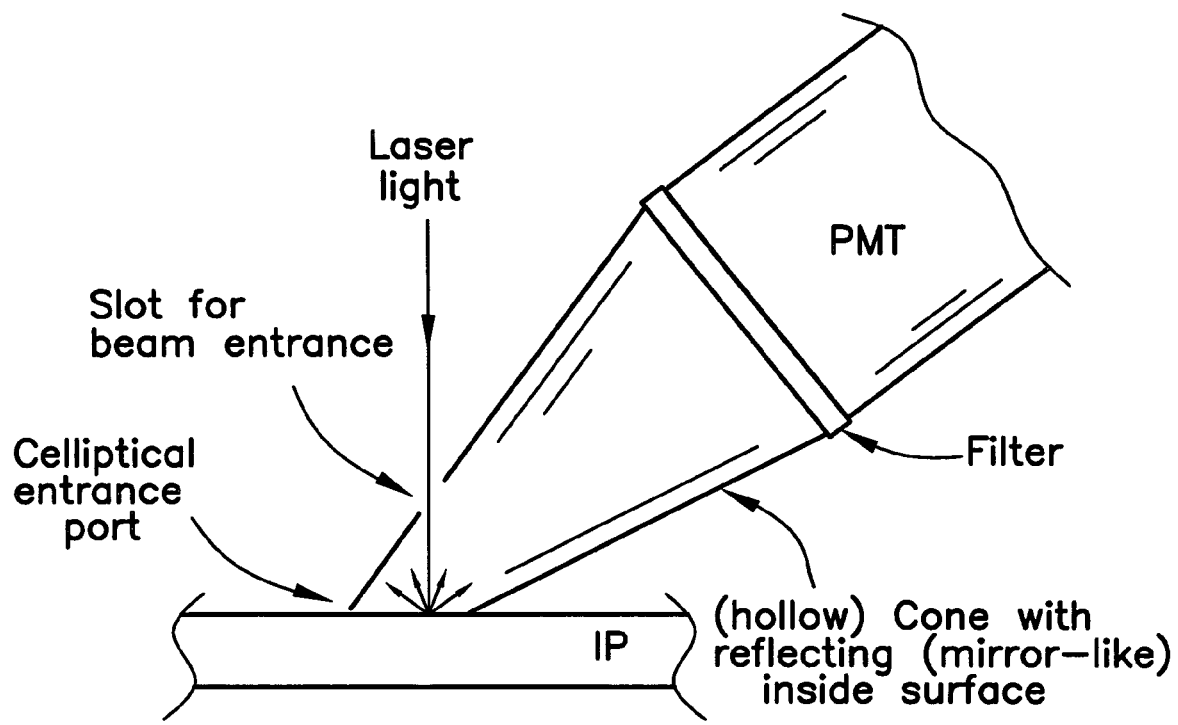
FIG. 13(a) is an enlarged view of the light collector of FIG. 11.
Figure 13B:
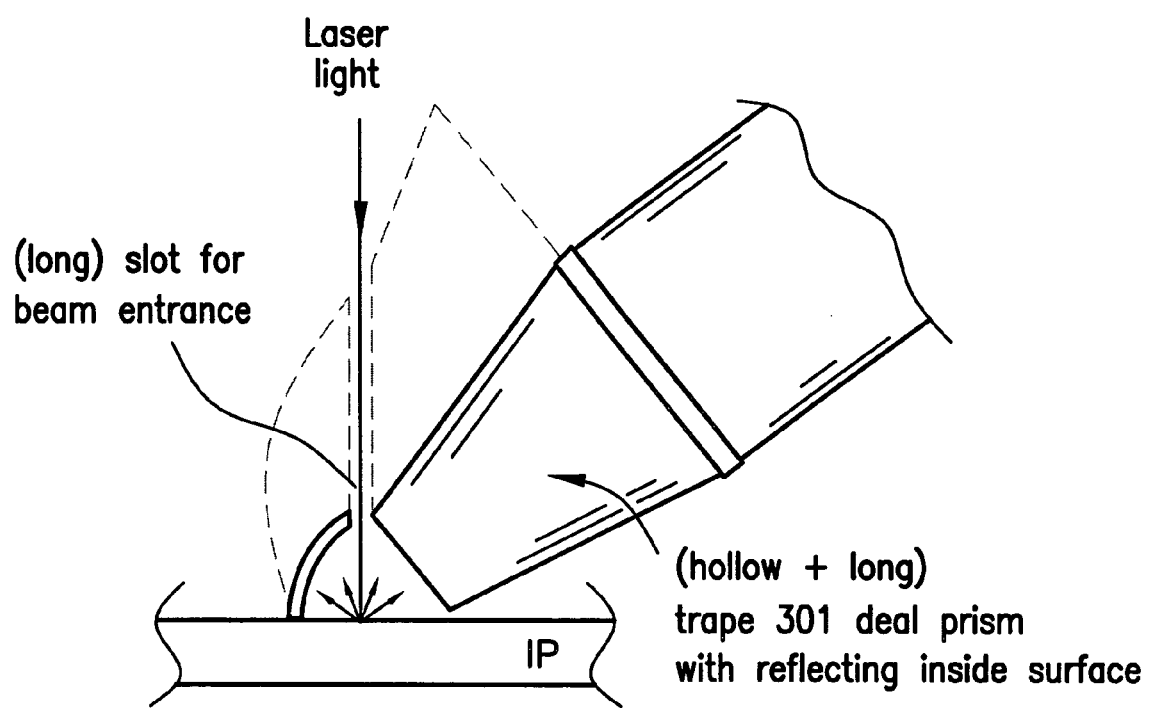
FIG. 13(b) is an enlarged view of the light collector of FIG. 12.

FIGS. 13(a) and 13(b) respectively, show the light collector 1 of FIG. 11 and light collector 21 of FIG. 12 in greater detail, both of which have interior mirror surfaces, as previously explained.

An air-cooled, laser-diode pumped, Nd:YVO4 laser from Showa Optronics Ltd., producing 3 W at 532 nm can be used as the light source (7), for example. The blue BG3 and BG39 bandpass filters from Schott glass can be used for optical filtration. The R6237-01 bialkali photocathode PMT's from Hamamatsu, Inc. are 75 mm square, and have a quantum efficiency about 30% at 400 nm, and can be used as the elements in the PMT array. A translation stage with stepping motor controller is available from Newmark Systems, Inc. with a travel of up to 30 cm and resolution of 1 micron, which is small compared to the expected scan pitch of 50 microns, for the application of digital mammography. The size of the stimulating beam at the imaging plate surface can conveniently be adjusted to be in the range 50-100 microns.

The light collector (1) and (21) design is a key element. It is important to maximize luminescent signal collection and gain in order to maximize the signal-to-noise ratio of the radiographic imaging system. In the particular design in FIG. 11, the collector (1) is a cone while in FIG. 12, it is a trapezoidal pyramid with slotted entrance port, and an opposing reflecting mirror to direct light into the entrance port of the collector (1). An entrance slot between the reflecting mirror and the top edge of the entrance port of the collector is provided, to allow entry of the scanning beam. The clearance between the entrance port/reflecting mirror and the image plate surface, and the beam entrance slot size are minimized in order to collect as many emitted luminescent photons as possible. Using a specular mirror surface finish for the inside surface of the collection device (21), we find, from ray tracing simulations, a collection efficiency of 64%, more than twice that obtained in a conventional CR scanner using a light guide and mirror arrangement (1), as in the prior art (FIG. 1).

The glass-ceramic imaging plates are enclosed in light-tight cassettes, which may be similar to film-screen cassettes. The cassettes are carried to the x-ray tube (and patient), and exposures are made in the usual way. After exposure, the plates carry a stored latent image (which persists for several hours), and the cassettes are taken to the readout scanner. The scanner (which is inside a dark enclosure) transports the imaging plates beneath the scanning laser optics, and the image is read out and stored in the image buffer in the readout system. The computer which drives the readout system is connected on a network (which may be a LAN) which in turn can communicate with at least one other workstation with image processing and high-resolution display capability. Additionally, image archive storage, other display devices such as laser film printers, and other (possibly remote) workstations are useful and are optionally connected to the network.

A theoretical model for the imaging performance of a transparent storage phosphor (TSP) based CR system is set forth. The imaging performance of the FCZ-based glass-ceramic samples is evaluated using clinical mammography equipment (for exposure) and our laboratory readout system (for image readout). The measured imaging performance is compared to that predicted by the model so that the relevant imaging parameters of the glass-ceramic materials are determined. The model is used to guide further optimization of the material to achieve imaging performance comparable to flat-panel digital mammography systems.

DQE Model and Measurements for TSP System

In electronic radiography the image detection, processing, and display functions are separate; therefore, they optimized independently. The detective quantum efficiency (DQE), which is the (squared) ratio of output to input signal-to-noise ratio (SNR), is used as a fundamental metric for measuring and comparing the performance of detectors for electronic radiography. The DQE, or signal-to-noise per input quantum, is optimized in a TSP and readout system.

DQE Model

It is useful to develop a theoretical model for detector system DQE, which includes both phosphor materials and readout component parameters as inputs and which can be verified by supporting experiments. Such a model can be used to help design an optimal readout method, and also to co-optimize phosphor material and other parameters in such a way as to realize the best possible system performance. Here we present a simplified model. In the future the model will be improved to include such things as the effect of characteristic x-rays and incident x-ray obliquity on MTF, sampling and the effect on aliased NPS and DQE, and other physical phenomena that are found to be important for imaging performance.

Since the early work of Shaw and Van Metter on DQE of radiographic imaging systems, similar analyses have been done by other workers on various x-ray imaging systems. Based on previous work, a simple preliminary result for the DQE of a storage phosphor-based CR system, including both phosphor and readout is as follows:

$$DQE(f, Q) = \frac{\alpha}{\frac{1}{A_s} + \frac{1}{m \cdot T^2(f) \cdot DQE_R(Q)}}$$

where
α=x-ray absorption
$A_S$=excess noise factor
m=number of stored charges/absorbed x-ray
T(f)=system MTF
$DQE_R(Q)$=readout system DQE
f=spatial frequency
Q=x-ray exposure This simplified model is suitable for initial research. The equation above resembles the corresponding result for the DQE of a screen/film system with the number of stored charges m replacing the number of promptly emitted photons, and the detective quantum efficiency of the readout system $DQE_R$ replacing the DQE of the film. The x-ray exposure dependence of the detector efficiency in CR arises from the readout system $DQE_R$, and is physically due to noise sources such as photo multiplier tube (PMT) dark noise and laser noise, as opposed to fog and density saturation in the screen film system. As a result, the storage phosphor system has much wider exposure latitude, 10,000:1 vs. 40:1.

The readout system has three fundamental components corresponding to photostimulation, collection and detection of signal-carrying photons. A simple model for the SNR performance of the readout system may be written as:

$$DQE_R = \frac{s}{N_s} \frac{c}{N_c} \frac{n}{N_d}$$

where
s=stimulation efficiency
c=collection efficiency
h=detector quantum efficiency
$N_s$=excess noise factor for stimulation
$N_c$=excess noise factor for collection
$N_d$=excess noise factor for detection Factors Influencing DQE The DQE model can be used to identify important factors to measure and to calculate their effect on the signal-to-noise performance of the CR system. We assume a scanning laser spot readout.

1. X-Ray Absorption Coefficient, a

This sets the upper limit on detection efficiency, and depends on the incoming x-ray spectrum and phosphor thickness. An advantage of TSP is that thickness may be increased without increasing image blur.

2. Storage Efficiency, m

This factor depends on phosphor composition and synthesis and has been extensively studied in previous research.

3. Exposure Constant, a

An extremely simple model of photostimulation gives:

$$s = 1 - \exp(-aCE)$$

where s is the stimulation efficiency, E is the stimulating light exposure, and a is the exposure constant, which is a characteristic of the storage phosphor material. This factor is related to the cross section for optical absorption of the storage states (e.g., F centers) in the material and determines the characteristics (intensity, exposure time) of the readout light source.

4. Luminescent Decay Time or "Afterglow".

In a scanning spot system, this factor must be shorter than the pixel dwell time.

5. Modulation Transfer Function, T(f)

In a TSP system with spot scan, this factor will depend on residual stimulating light scatter (expected to be small), and on the size and shape of the stimulating spot. It is expected to be extremely high. It is also expected to depend on the magnitude of the stimulating exposure E, and care must be taken in readout to deal with this effect.

6. Noise Aliasing

This factor can be controlled or eliminated in a TSP system with spot scan, even though the MTF of the primary x-ray detector component is extremely high. For example, aliasing in the transport direction can be controlled by proper selection of the beam size along this axis. Aliasing in the fast-scan direction can be controlled by a combination of beam shape and electronic filtering. This is an advantage over flat-panel x-ray detector systems with high-resolution primary detectors where noise aliasing can be a problem in applications requiring high resolution, like mammography.

7. Gain, g

An important factor in any CR system is the overall gain, which is the final number of detected electrons produced, per absorbed x-ray. This plays a direct role in the model for DQE, as can be seen by combining equations FOR DQE and s:

$$g = m \cdot s \cdot c \cdot \eta.$$

A rule of thumb is that for "good" (SNR limited by x-ray quantum noise, and not detector noise) performance in an x-ray detector system, the gain should approach 10.

8. Excess Noise in Phosphor, $A_S$

The statistical efficiency of detection (in a charge integrating system) is limited by the fact that the optical pulses produced by individual absorbed x-rays have a wide distribution in size. In a CR system, the width of this distribution arises from charge storage fluctuations, characteristic K fluorescence escape, and optical effects, including the variation of stimulation probability and escape probability with absorbed x-ray depth. Excess noise effects in previous turbid CR phosphor screens have been observed to be larger than in conventional phosphors, at least partly due to the variation in stimulation efficiency, which is absent in the conventional system. TSPs, however, are expected to show little or no optical depth effects, which if proven true will be advantageous over previous systems.

9. Excess Noise in Readout, $N_s$, $N_c$, and $N_d$

Excess noise in the readout components reduces their DQE below that for simple binomial processes, described by the quantum efficiencies for stimulation, collection, and detection. In stimulation, an example of an excess noise process would be laser noise. Another important effect in CR systems is excess noise due to "flare". Flare results in noise in the signal from a low-exposure area, due to spillover of the stimulating light onto possibly adjacent high-exposure areas, and is a limiting factor in system dynamic range. An example of excess noise in the detection component would be noise from dynode chain statistics, if a photomultiplier tube were used.

Measurements

Each important factor in the model for DQE performance can be calculated, and the results compared with experiments. The various parameters of interest and the supporting measurements and methods are listed in the Table.

TABLE

DQE model-related measurements.

| Factor | Symbol | Method | Vary |
|---|---|---|---|
| X-ray absorption | | Ionization chamber | Thickness, x-ray spectrum |
| Excess noise (prompt) | $A_s$ | Pulse Height Spectrum | X-ray energy |
| Exposure const | a | Bench top sensitometer | Phosphor material |
| Storage efficiency | m | Bench top sensitometer | Phosphor material |
| MTF | T | Offline scanner | Phosphor, read exposure |
| Flare | F | Offline scanner | Target, collector |
| Stimulation efficiency & noise | s | Component measurement | |
| Collection efficiency & noise | c | Component measurement | |
| Detector efficiency & noise | | Component measurement | |
| Stimulation spectrum | | Offline optical | Phosphor material |
| Emission spectrum | | Offline optical | Phosphor material |
| Afterglow time | | Offline optical | Phosphor material |

Imaging Performance Evaluation

Noise power spectrum (NPS) characterizes the amount of noise and its texture, will be measured using standard techniques. The shape of the NPS is important in determining the presence of secondary quantum noise. Secondary quantum noise is caused by having too few optical quanta detected per interacting x ray. If secondary quantum noise exists, then there will be a plateau in the NPS at high spatial frequencies. It differs from NPS due to the detector readout, because the plateau level will depend on the x-ray exposure, whereas detector noise is independent of x-ray exposure. Detective quantum efficiency (DQE), is a measure of the dose efficiency of the detector. It can be calculated using the equation:

$$DQE(f) = \frac{K^2 MTF^2(f)}{NPS(f)Q}$$

where f is the spatial frequency, K is the slope of the characteristic curve, and Q is the x-ray photon fluence incident on the detector.

Noise equivalent quanta (NEQ), which characterizes the signal-to-noise properties of the detector. It can be calculated using the equation:

$$DQE(f) = \frac{K^2 MTF^2(f)}{NPS(f)}$$

The NPS will be measured as a function of x-ray exposure to the detector covering a range of exposures from 1 mR to 1 R. This will allow us to compute DQE and NEQ as a function of spatial frequency and x-ray exposure.

The Swank noise, $A_S$, will be measured indirectly from measurements of image noise, input exposure, and quantum detection efficiency, $A_Q$, as a function of energy, as follows. Uniform exposures over a small area of the glass phosphor can be made and read out. For a given exposure, the mean pixel value in the small area will be computed. Correcting for small changes in exposure, the standard deviation in the measured mean pixel values is the DC noise component of the detector. It is equal to the square root of the product of the x-ray fluence, $A_Q$, and $A_S$. Thus, $A_S$ can be estimated by converting the exposure to fluence.

The Lubberts effect can in principle be determined by comparing the MTF squared with the shape of the NPS due to x-ray quantum noise (the NPS normalized to 1 at zero spatial frequency). The x-ray quantum NPS can be determined from the total NPS and the NPS due to electronic noise and secondary quantum noise, both of which can be measured in separate experiments.

The secondary quantum noise can be measured following the method of Maidment and Yaffe. During readout the light collection efficiency of the lens system will be modified using neutral density filters placed between two low f-number lenses. By measuring the total NPS over a uniformly exposed region in the image as a function of the relative light collection efficiency, we can estimate the secondary quantum noise power at high spatial frequencies. This enables us to determine the required light collection efficiency to avoid degradation in DQE due to secondary quantum noise.

Contrast Detail Detectability

The CDMAM 3.4 phantom was specifically designed for digital mammography and contains rows and columns of gold disks with varying diameter and thickness. Disk diameter ranges from 0.6 to 2 mm (16 in total) and disk thickness ranges from 0.3 to 2 mm (16 in total). Each square (location) within the phantom contains two disks with one centrally located and the other in a randomly chosen corner.

The Aufrichtig method is based on the original work of Ohara, Burgess and Xue. A signal detection model is assumed in which a continuous decision variable internal to the observer with Gaussian probability density functions for the choice of "disk present" or "no disk present". Then the percent correct is the distance between the means of these two distributions and is equal to the product of the disk contrast and a parameter u. Basically, for a given diameter size, the number of correct choices as a function of the aperture contrast is computed. From the fraction of correctly detected disks we obtained the maximum-likelihood estimate of u. One can then calculate its standard error based on assuming that there were K trials defined by N repetitions at L contrasts, based on the probability of a correct choice of $k^{th}$ trial, the disk contrast in $k^{th}$ trial, and the cumulative Gaussian distribution, as given by Aufrichtig.

While the invention has been particularly shown and described with reference to a preferred embodiment hereof, it will be understood by those skilled in the art that several changes in form and detail may be made without departing from the spirit and scope of the invention.

The embodiments of the invention in which an exclusive property or privilege is claimed are defined as follows:

1. A computed radiography system, comprising a stimulating light source,
a photostimulable glass imaging plate (PGIP) substantially transparent to the stimulating light positioned such that the stimulating light impinges said PGIP perpendicularly thereto producing photostimulated luminescence light (PLL) having a wave length different from said stimulating light source, a light collector having a light reflecting inner surface proximate said PGIP for collecting PLL emitted from said PGIP and having a hole or slot therein for admitting stimulating light into said light collector and onto said PGIP, an optical filter in communication with said light collector for blocking stimulating light waves and passing PLL therethrough, a light detector for receiving PLL from said optical filter and said light collector, a mechanism providing relative movement in two orthogonal directions between said PGIP and said stimulating light source while maintaining the perpendicular relationship between the PGIP and the stimulating light, and a mechanism including an analog to digital converter for converting the collected and detected PLL to a diagnostic readout.

2. The system of claim 1, wherein said stimulating light source is a laser.

3. The system of claim 2, wherein said laser emits light having a wavelength in the range of from about 500 to about 750 nanometers (nm).

4. The system of claim 3, wherein said laser emits light having a wavelength in the range from about 500 nm to about min 650 nm.

5. The system of claim 1, wherein the PLL has a wavelength in the range of from about 350 to about 495 nm.

6. The system of claim 5, wherein the PLL has a wavelength in the range from about 350 to about 450 nm.

7. The system of claim 1, wherein said PGIP includes a fluorochlorozirconate glass having nanocrystalline particles distributed therein.

8. The system of claim 7, wherein the chloride ions are present in the range from about 10% to about 20% of the anions in said glass and Eu is present in doping quantities.

9. The system of claim 1, wherein said slot in said light collector is of sufficient length to be coextensive with one dimension of said PGIP.

10. The system of claim 1, wherein a light reflecting material is on the side of said PGIP away from the impinging stimulating light for reflecting light having wavelengths in the range from about 350 to about 495 nm.

11. The system of claim 1, wherein said light collector is conically shaped.

12. The system of claim 1, wherein said light collector is trapezoidally shaped.

13. The system of claim 1, wherein said light reflecting inner surface of said light collector covers substantially the entire inner surface of said light collector.

14. The system of claim 1, wherein said light detector comprises a vacuum photomultiplier tube.

15. A computed radiography system, comprising a stimulating light source, a photostimulable glass imaging plate (PGIP) having nanocrystalline particles distributed therein substantially transparent to the stimulating light positioned such that the stimulating light impinges said PGIP perpendicularly thereto producing photostimulated luminescence light (PLL) having a wave length different from said stimulating light source, a hollow light collector having a light reflecting inner surface proximate said PGIP for collecting PLL emitted from said PGIP and having a hole or slot therein for admitting stimulating light into said hollow light collector and onto said PGIP, an optical filter in communication with said hollow light collector for blocking stimulating light waves and passing PLL therethrough, a light detector for receiving PLL from said optical filter and said hollow light collector, a mechanism providing relative movement in two orthogonal directions between said PGIP and said stimulating light source while maintaining the perpendicular relationship between the PGIP and the stimulating light, and a mechanism including an analog to digital converter for converting the collected and detected PLL to a diagnostic readout.

16. The system of claim 15, wherein said stimulating light source is a laser emitting light having a wavelength in the range from about 500 to about 650 nm.

17. The system of claim 15, wherein the PLL has a wavelength in the range from about 350 to about 450 nm.

18. The system of claim 15, wherein said PGIP includes a fluorochlorozirconate glass with chloride ions present in the range from bout 10% to about 20% of the anions in said glass and Eu is present in doping quantities.

19. The system of claim 15, wherein said light collector is conical or trapezoidal in shape with the smaller end proximate said PGIP.

20. The system of claim 15, wherein the collection efficiency of the PLL is at least about 60%.

21. The system of claim 15, wherein the flare of said stimulating light is less than about 1%.

22. A computed radiography system for reading exposed mammography plates, comprising a source of laser light having a wavelength in the range from about 500 nm to about 750 nm, a photostimulable glass imaging plate (PGIP) having nanocrystalline particles distributed therein previously exposed to x-ray radiation and substantially transparent to the laser light positioned such that the laser light impinges said PGIP perpendicularly thereto producing photostimulated luminescence light (PLL) having a wave length different from and less than said laser light, a hollow light collector having a light reflecting inner surface proximate said PGIP for collecting PLL emitted from said PGIP and having a hole or slot therein for admitting laser light into said hollow light collector and onto said PGIP, an optical filter in communication with said hollow light collector for blocking laser light and passing PLL therethrough, a light detector receiving PLL from said optical filter and said hollow light collector, a mechanism providing relative movement in two orthogonal directions between said PGIP and said laser light while maintaining the perpendicular relationship between the PGIP and the laser light, and a mechanism including an analog to digital converter for converting the collected and detected PLL to a diagnostic readout.

* * * * *

UNITED STATES PATENT AND TRADEMARK OFFICE
CERTIFICATE OF CORRECTION

PATENT NO. : 8,008,642 B2
APPLICATION NO. : 12/156300
DATED : August 30, 2011
INVENTOR(S) : Stefan Schweizer, Jacqueline A. Johnson and Anthony R. Lubinski It is certified that error appears in the above-identified patent and that said Letters Patent is hereby corrected as shown below:

IN THE SPECIFICATION:

Column 1, line 3, insert the heading --Contractual Origin of the Invention--.

Column 3, line 44, delete "13 lp/mmm" and insert --13 lp/mm--.
   line 64, delete "a", second occurrence, and insert --at--.

Column 4, line 21, after the word "box" insert --;--.
   line 35, before the word "Characterization", insert --•--.
   line 37, before the word "Determine", insert --•--.
   line 39, before the word "Measure", insert --•--.
   line 41, before the word "Identify", insert --•--.

Column 5, line 67, delete the word "is" and insert --as--.

Column 8, line 21, before the beginning of the sentence, indent the word "Samples".

Column 9, line 25, delete the term "g-3.0" and insert --g=3.0--.

Column 11, line 67, delete the word "slight" and insert --light--.

Column 12, line 8, delete the numeral "1" and insert --11--.

Column 15, line 39, delete the letter "h" and insert --n--.

Column 17, line 19, delete the word "characterizes" and insert --characterizing--.

Column 17, line 45, beginning at the equation, delete "DQE" and insert --NEQ--.

Signed and Sealed this
Seventh Day of February, 2012

David J. Kappos
*Director of the United States Patent and Trademark Office*

IN THE CLAIMS

Claim 4, column 19, line 28, delete "min".

Claim 18, column 20, line 25, delete the word "bout" and insert --about--.